(12) United States Patent
Peng

(10) Patent No.: US 8,272,541 B2
(45) Date of Patent: Sep. 25, 2012

(54) DEVICE FOR MEASURING AND DISPENSING POWDER MATERIALS

(76) Inventor: Shi Peng, Shenzhen (CN)

( * ) Notice: Subject to any disclaimer, the term of this patent is extended or adjusted under 35 U.S.C. 154(b) by 978 days.

(21) Appl. No.: 12/227,580

(22) PCT Filed: Jul. 26, 2006

(86) PCT No.: PCT/CN2006/001860
§ 371 (c)(1),
(2), (4) Date: Nov. 19, 2008

(87) PCT Pub. No.: WO2007/134493
PCT Pub. Date: Nov. 29, 2007

(65) Prior Publication Data
US 2009/0145931 A1    Jun. 11, 2009

(30) Foreign Application Priority Data

May 23, 2006   (CN) .......................... 2006 2 0034378

(51) Int. Cl.
*B65D 88/54* (2006.01)
(52) U.S. Cl. ........................................ 222/337; 222/366
(58) Field of Classification Search ................. 222/361, 222/366, 336, 337, 449
See application file for complete search history.

(56) References Cited

U.S. PATENT DOCUMENTS

| | | | | |
|---|---|---|---|---|
| 589,386 A * | 8/1897 | Gerhard | ......................... | 222/288 |
| 847,000 A * | 3/1907 | Helmhold | ...................... | 222/332 |
| 1,608,832 A * | 11/1926 | Birdseye | ....................... | 426/643 |
| 1,676,348 A * | 7/1928 | O'Leary | ........................ | 222/366 |
| 2,141,352 A * | 12/1938 | Forsberg et al. | ............... | 222/512 |
| 2,857,083 A * | 10/1958 | Masterson | ..................... | 222/361 |
| 4,836,424 A * | 6/1989 | Afshar | .......................... | 222/279 |

* cited by examiner

*Primary Examiner* — Kevin P Shaver
*Assistant Examiner* — Daniel R Shearer

(57) ABSTRACT

A dispenser for measuring and dispensing powder materials includes a slide housing having a powder inlet slot, a slide having a measure slot, and an elastic element. The slide is pressed against the slide housing by the elastic element to make the slide move relative to the slide housing. The slide moves between the first position and the second position. On the first position, the measure slot is in alignment with the powder inlet slot and the powder is filled into the measure slot; on the second position, the measure slot moves away from the powder inlet slot and the powder is discharged from the measure slot. The elastic element makes the slide press against the slide housing during moving to reduce the clearance between the slide and the slide housing, makes the slide move smoothly, and reduces the precision demand of manufacture and assembly.

5 Claims, 25 Drawing Sheets

A conventional powder dispensing device generally comprises a slide and a slide housing, wherein the slide is slidably or rotatably coupled with the slide housing and is adapted to move between a first position for filling the powder material and a second position for dispensing the powder material.

Accordingly, all conventional powder dispensing devices have a common drawback. The slide housing must provide enough space for the slide to slide or rotate between the first and second positions. Or, the slide is pivotally coupled with the slide housing such that the slide can be pivotally moved between the first and second positions. If the slide is tightly coupled with the slide housing, i.e. the space of the slide housing is too small, the slide cannot be moved smoothly to move between the first and second positions. If the slide is loosely coupled with the slide housing, i.e. the space of the slide housing is too large, the clearance between the slide and the slide housing is large enough for the powder material to leak through the clearance. If the space of the slide housing is not even in size or the size of the slide is not symmetry, the slide cannot be moved smoothly to move between the first and second positions and the powder material will also leak at the clearance during the movement of the slide.

The precision requirement for assembling the slide and the slide housing is very high. In other words, when the slide is not perfectly match with the slide housing, the device cannot effectively dispense the powder material. Therefore, every single part of manufacturing in the mold and their assembling are highly required to meet a standard of precision. Moreover, the precision level of dispensing the powder material is equivalent to the precision level of measuring the powder material. According to the existing technology and its manufacturing method, the conventional device for measuring and dispensing powder materials is obviously unable for mass production to meet the current needs.

SUMMARY OF THE PRESENT INVENTION

A main object of the present invention is to provide a device for measuring and dispensing powder materials to overcome the existing problems of measuring and dispensing powder materials, wherein the present invention provides the device for effectively measuring and dispensing powder materials and enhances convenient manufacturing and assembling process of the device.

Accordingly, in order to accomplish the above object, the present invention provides a device for measuring and dispensing powder materials, comprising a slide housing, a slide, and an elastic unit, the slide housing having a through powder inlet slot, the slide having a measure slot. The slide is movably coupling with the slide housing at a position that the elastic unit applies an urging force at the slide to retain the slide in position. The slide is adapted to move between a first position and a second position, wherein at the first position, the measure slot of the slide is in alignment with the powder inlet slot of the slide housing for the powder materials being filled into the measure slot through the powder inlet slot, and at the second position, the measure slot of the slide is moved away from the powder inlet slot of the slide housing for discharging the powder materials from the measure slot of the slide.

Accordingly, the slide has a coupling side slidably engaging with the slide housing, wherein the elastic unit has an affixing end being affixed in position and an elastic free end biasing against the slide to apply the urging force thereat so as to ensure the coupling side of the slide being engaged with the slide housing.

The elastic unit provides the following assembling ways. The elastic unit is a separated unit supported between the slide and the slide housing to apply the urging force against the slide. Or, the elastic unit is integrally extended from the slide housing to apply the urging force against the slide. Likewise, the elastic unit can be integrally extended from the slide to apply the urging force against the slide housing. The elastic unit can be made of metal, plastic, or other elastic materials and can be an elastic piece, a compression spring, a spring clip, silica gel, foam, or other elastic materials for applying the urging force between the slide and the slide housing.

The slide comprises a blocking panel defining the coupling side thereat and a blocking wall extended from the blocking panel to define the measure slot within the blocking wall, wherein when the slide is moved at the second position, an outlet of the powder inlet slot is sealed by the coupling side of the blocking panel.

The slide housing comprises a slide body and a retention panel, wherein the powder inlet slot is a through slot provided at the slide body. The retention panel is coupled at a bottom side of the slide body and has a through hole communicating with the powder inlet slot. The slide is coupled at a bottom side of the retention panel, wherein the elastic unit has a U-shaped cross section securely clamping with the retention panel and the slide.

The slide is pivotally coupled with the slide housing at a bottom side thereof, wherein the slide comprises a blocking panel and a blocking wall extended therefrom. When the slide is moved at the second position, an outlet of the powder inlet slot is sealed by the blocking panel, wherein the measure slot is formed within the blocking wall.

The slide housing comprises an axle extended downwardly and vertically. The slide is coupled at the slide housing at a bottom side thereof, wherein the slide comprises a ring-shaped inner wall, a ring-shaped outer wall, and at least a blade radially extended from the inner wall to the outer wall to define one or more measure slots within the blade and the inner and outer walls. The slide further comprises a cover panel having a first dispensing opening and a retention panel having a second dispensing opening. The elastic unit is upwardly and inclinedly extended from the retention panel towards the cover panel. The axle of the slide housing is slidably passing through the inner wall and the cover panel to coaxially couple with the retention panel, wherein at each of the first and second positions, at least one of the measure slots is aligned with the powder inlet slot while another the measure slot is aligned with the first and second dispensing openings.

The slide housing has a rotating cavity and a dispensing opening, wherein an axis of the rotating cavity is set horizontally. The elastic unit is extended from a wall of the rotating cavity in a suspended manner. The slide comprises a left side panel defining the coupling side thereat, a right side panel, and a plurality of blades extended between the left and right side panels in a radial manner to define the measure slots within the blades and the left and right side panels. The slide is horizontally placed in the rotating cavity at a position that the coupling side of the left side panel is biased against the slide housing while the right side panel is biased against the elastic unit, wherein at each of the first and second positions, one of the measure slots is aligned with the powder inlet slot while another the measure slot is aligned with the dispensing opening.

In addition, the slide housing has a plurality of indent grooves provided at an inner circumferential surface of the slide housing. The slide has a guiding protrusion protruded from an outer surface of the slide and arranged in such a manner that when the slide is slidably rotated within the slide housing, the guiding protrusion is guided to slide at the indent grooves, wherein a height of the guiding protrusion is larger than a depth of each of the indent grooves.

Accordingly, the device further comprises a powder container for containing the powder materials therein, wherein the powder container has a bottom opening and arranged in such a manner that when the slide housing is coupled at a bottom side of the powder container, the bottom opening is aligned with the powder inlet slot.

The advantage of the present invention is that the slide can fittingly press at the slide housing by means of the elastic force of the elastic unit to minimize the clearance between the slide and the slide housing and to enhance the sliding movement of the slide with respect to slide housing. In addition, the present invention provides a simple structural configuration for reducing the precision level of the manufacturing and assembling requirement of the device.

These and other objectives, features, and advantages of the present invention will become apparent from the following detailed description, the accompanying drawings, and the appended claims.

DETAILED DESCRIPTION OF THE PREFERRED EMBODIMENT

Figure 1:
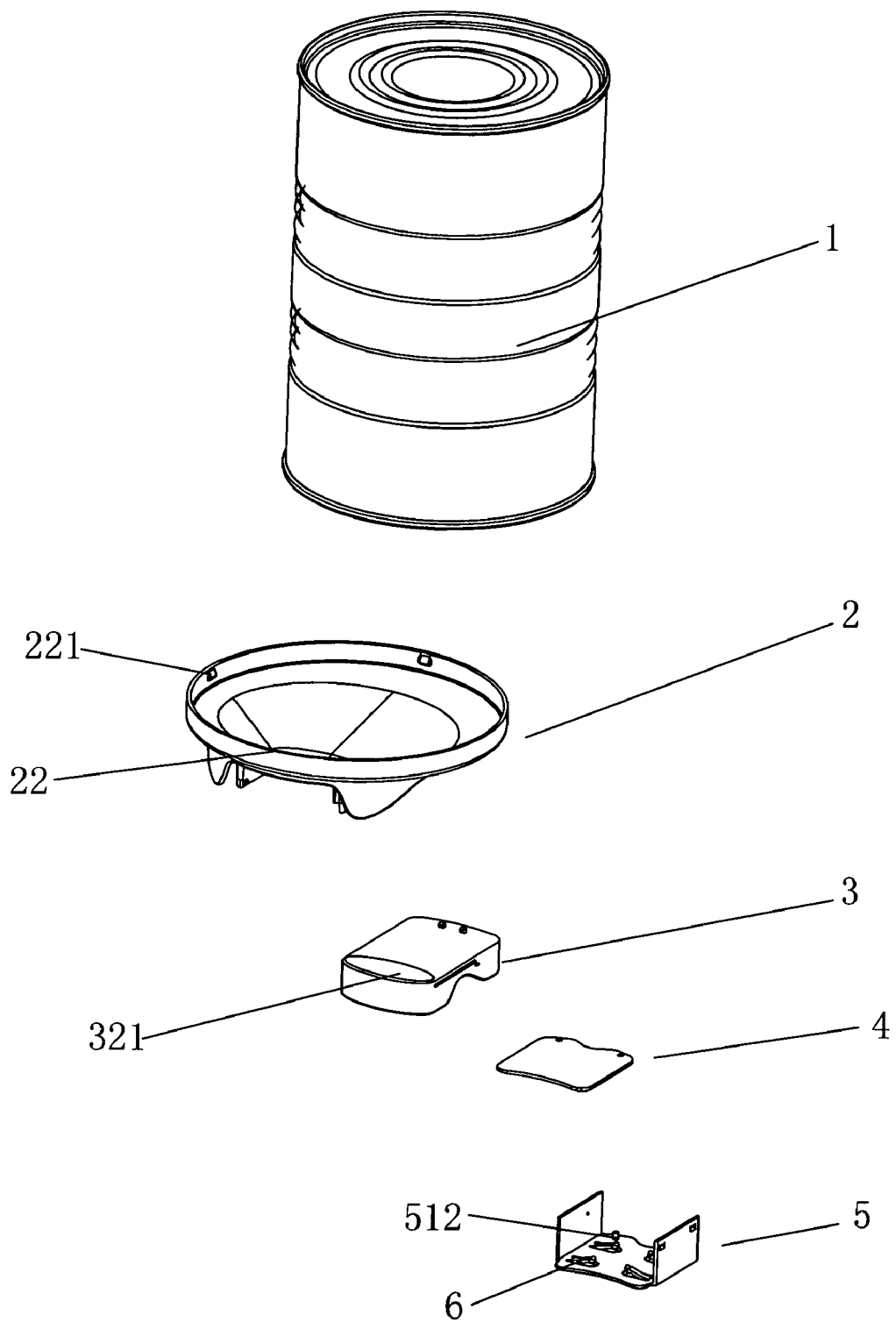
FIG. 1 is a top exploded perspective view of a dispenser for measuring and dispensing powder materials according to a first preferred embodiment of the present invention, illustrating the powder container being supported at an upright position.
Figure 2:
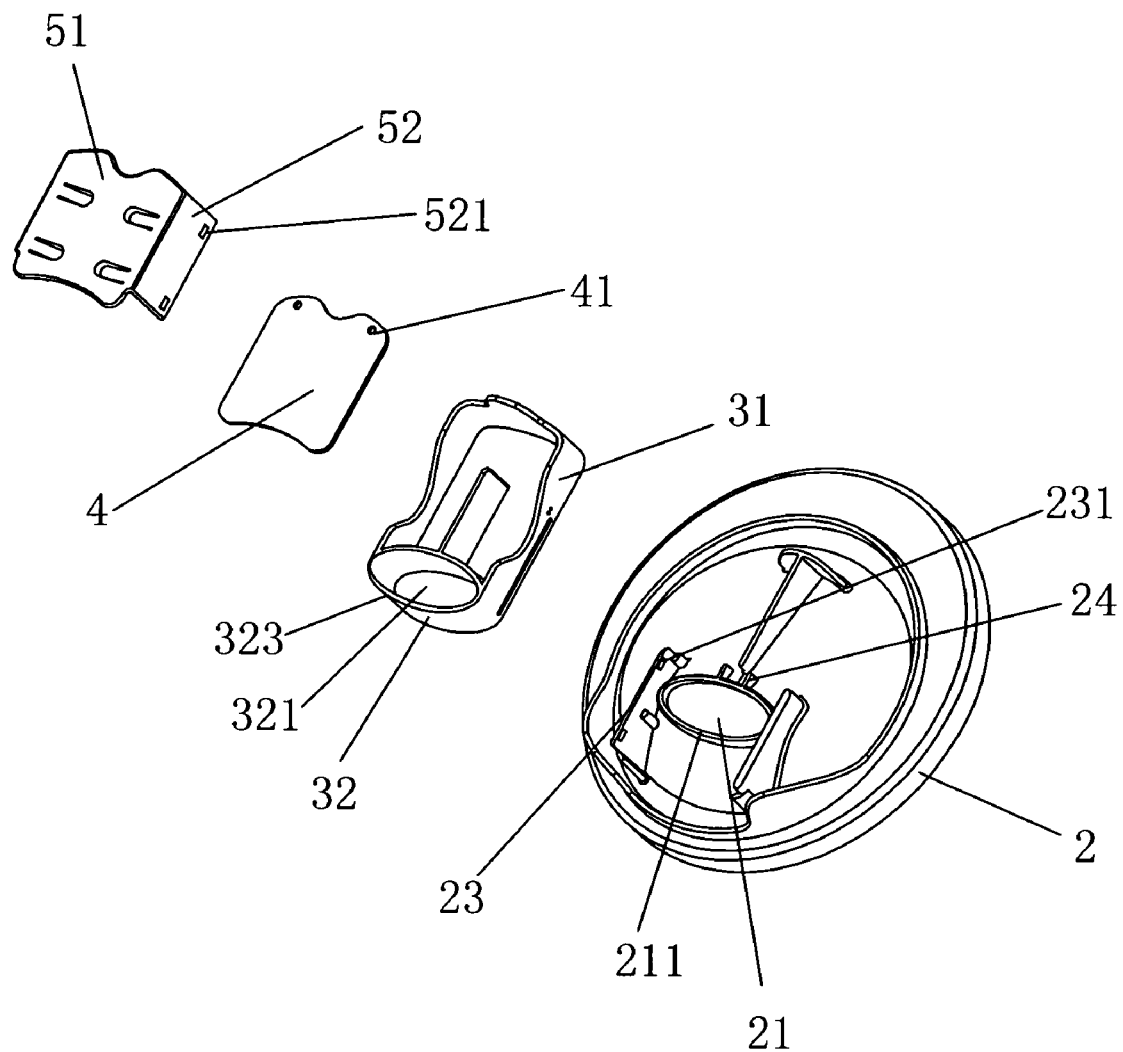
FIG. 2 is a bottom exploded perspective view of the dispenser according to the above first preferred embodiment of the present invention, wherein the powder container is omitted in FIG. 2.
Figure 3:
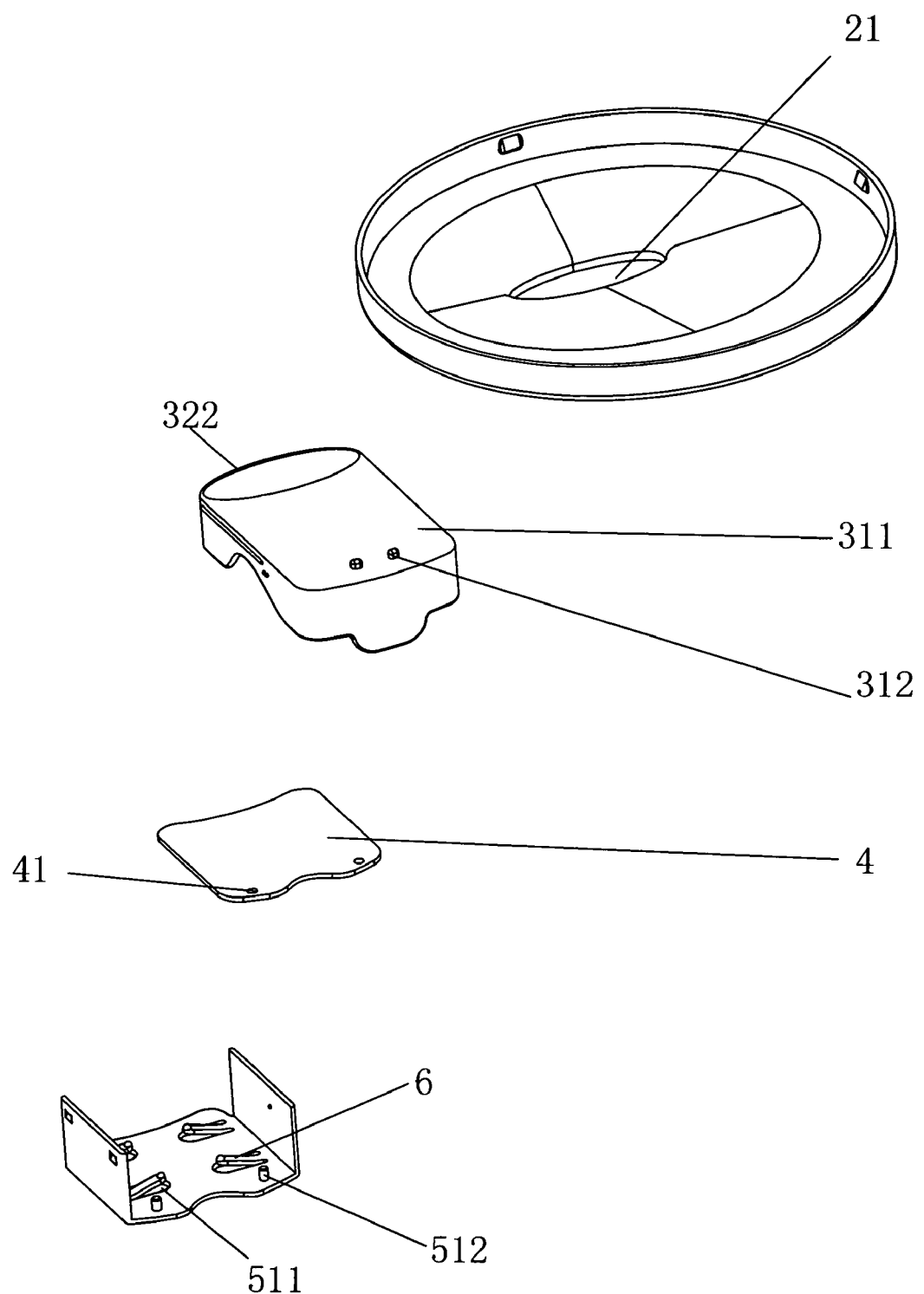
FIG. 3 is a top exploded perspective view of the dispenser according to the above first preferred embodiment of the present invention, wherein the powder container is omitted in FIG. 3.
Figure 4:
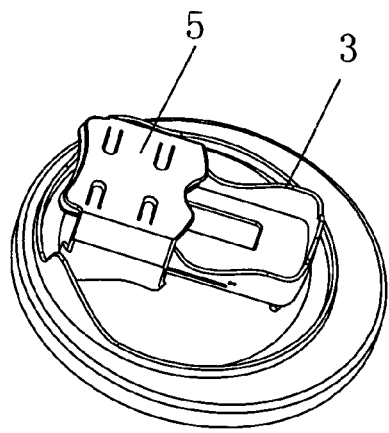
FIG. 4 is a perspective view of the dispenser according to the above first preferred embodiment of the present invention, illustrating the slide at a first position, wherein the powder container is omitted in FIG. 4.
Figure 5:
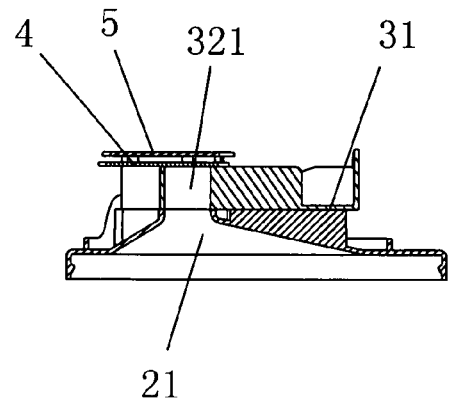
FIG. 5 is a sectional view of the dispenser according to the above first preferred embodiment of the present invention, illustrating the slide at the first position.
Figure 6:
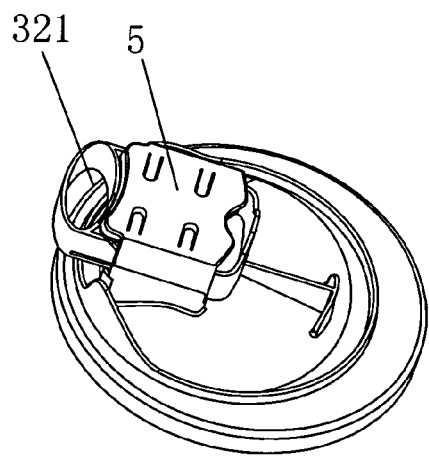
FIG. 6 is a perspective view of the dispenser according to the above first preferred embodiment of the present invention, illustrating the slide at a second position, wherein the powder container is omitted in FIG. 6.
Figure 7:
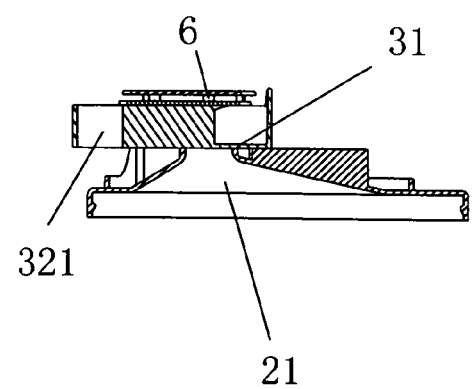
FIG. 7 is a sectional view of the dispenser according to the above first preferred embodiment of the present invention, illustrating the slide at the second position.
Figure 8:
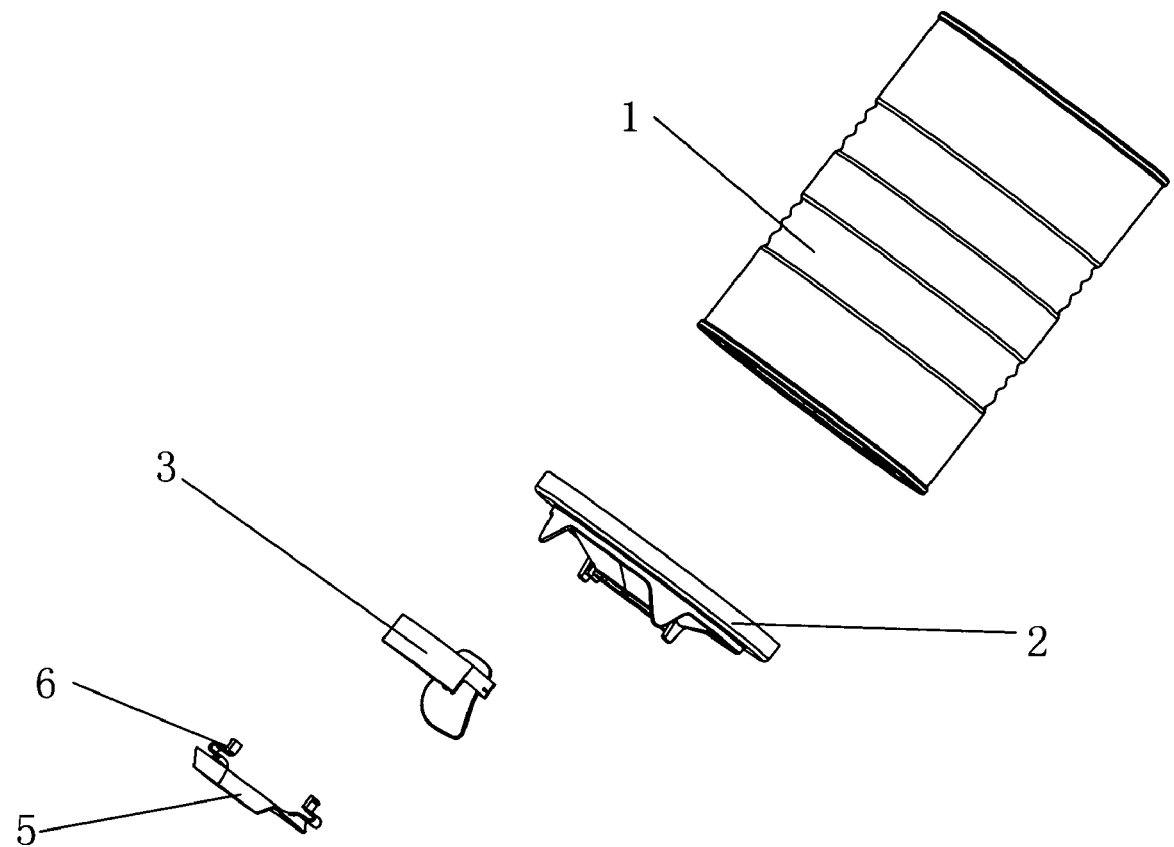
FIG. 8 is a top exploded perspective view of a dispenser according to a second preferred embodiment of the present invention, illustrating the powder container being supported at an upright position.
Figure 9:
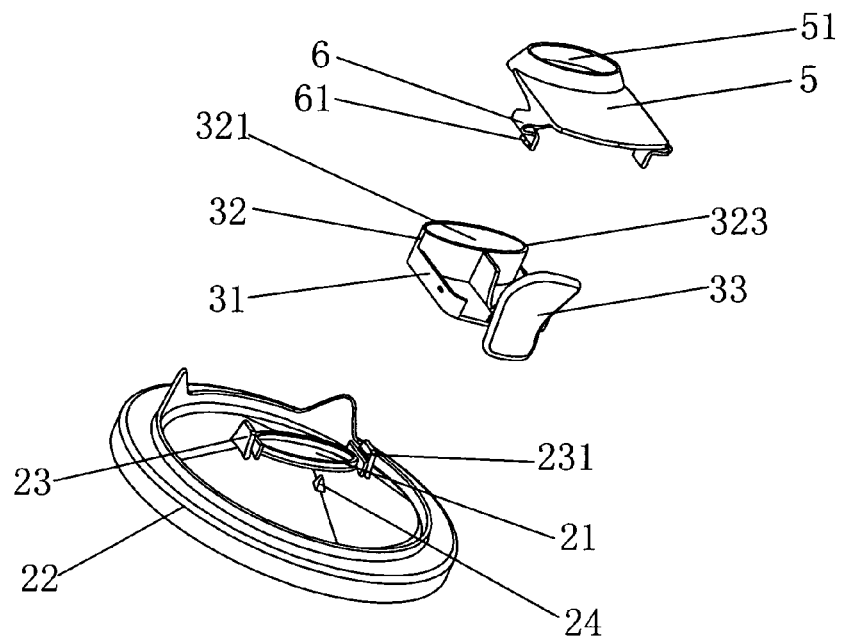
FIG. 9 is a bottom exploded perspective view of the dispenser according to the above second preferred embodiment of the present invention, wherein the powder container is omitted in FIG. 9.
Figure 10:
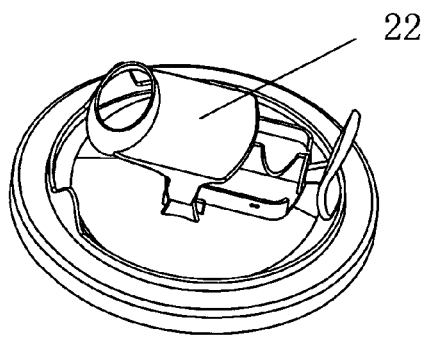
FIG. 10 is a perspective view of the dispenser according to the above second preferred embodiment of the present invention, illustrating the slide at a second position, wherein the powder container is omitted in FIG. 10.
Figure 11:
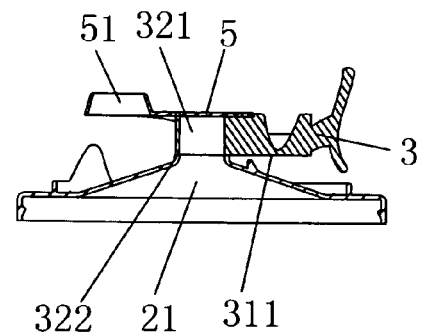
FIG. 11 is a sectional view of the dispenser according to the above second preferred embodiment of the present invention, illustrating the slide at the second position.
Figure 12:
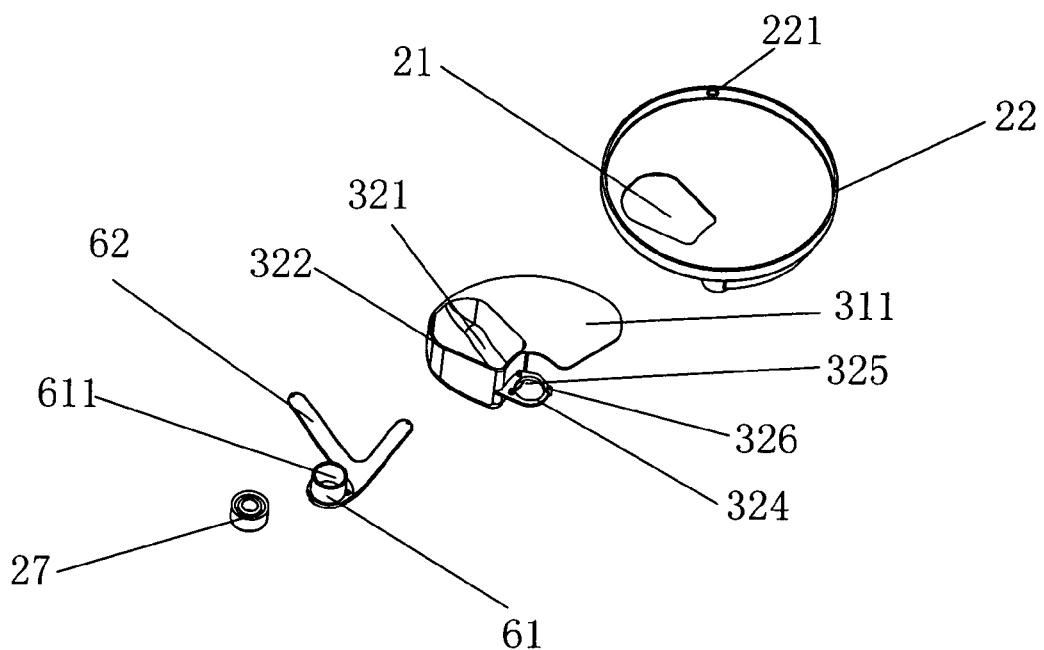
FIG. 12 is a top exploded perspective view of the dispenser according to the above third preferred embodiment of the present invention, wherein the powder container is omitted in FIG. 12.
Figure 13:
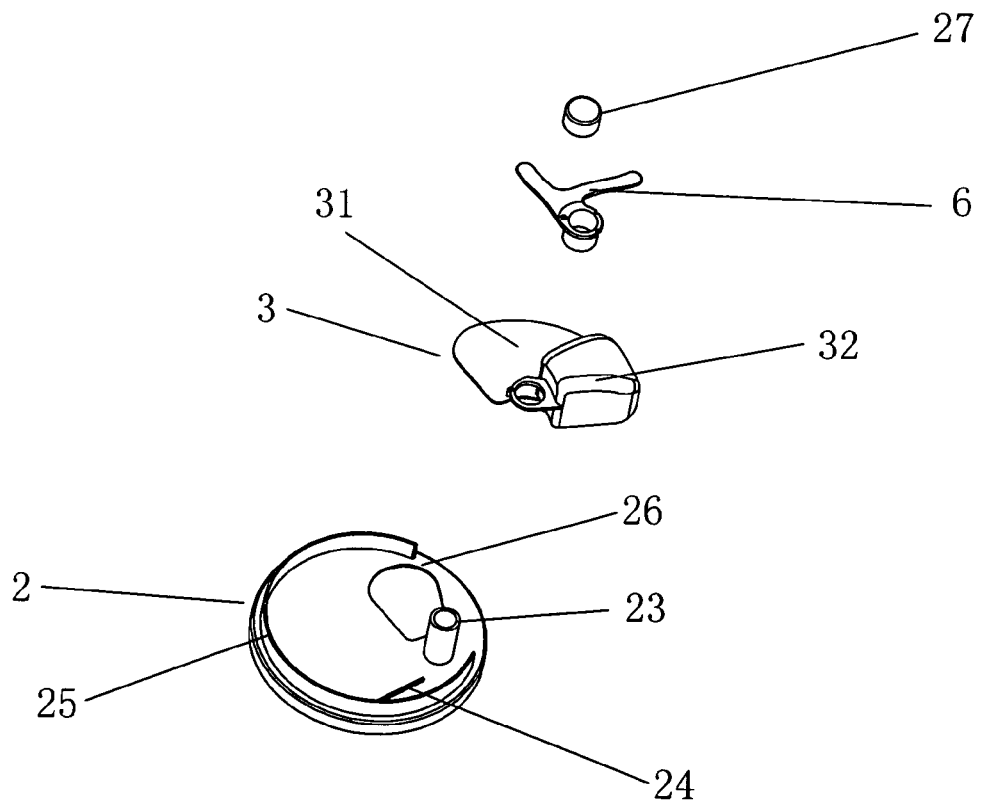
FIG. 13 is a bottom exploded perspective view of the dispenser according to the above third preferred embodiment of the present invention, illustrating the slide at a second position, wherein the powder container is omitted in FIG. 13.
Figure 14:
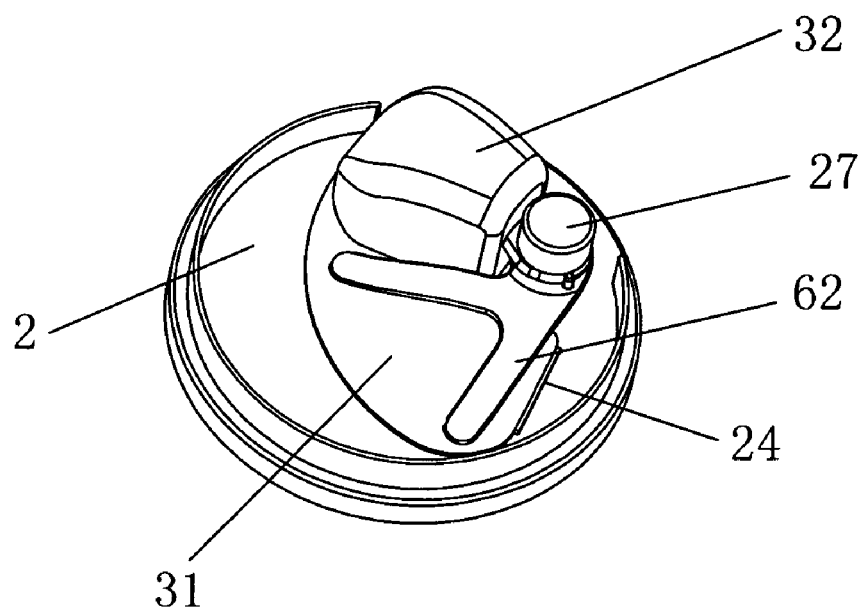
FIG. 14 is a perspective view of the dispenser according to the above third preferred embodiment of the present invention, illustrating the slide at the first position, wherein the powder container is omitted in FIG. 14.
Figure 15:
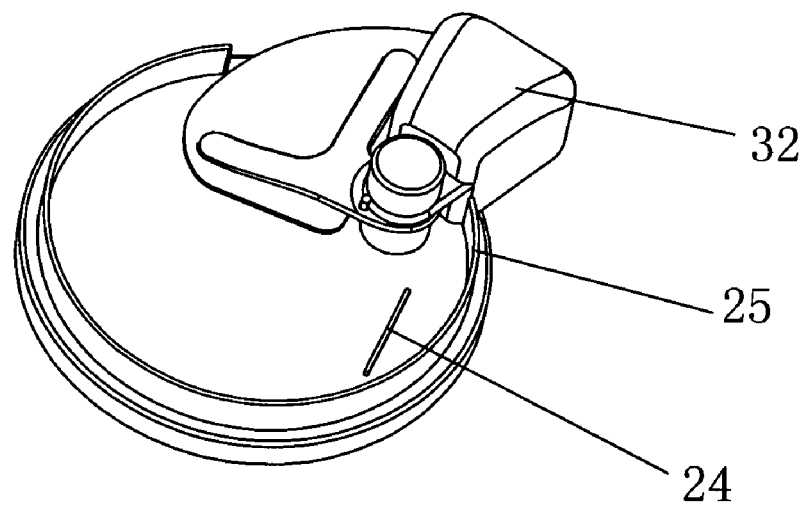
FIG. 15 is a perspective view of the dispenser according to the above third preferred embodiment of the present invention, illustrating the slide at the second position, wherein the powder container is omitted in FIG. 15.
Figure 16:
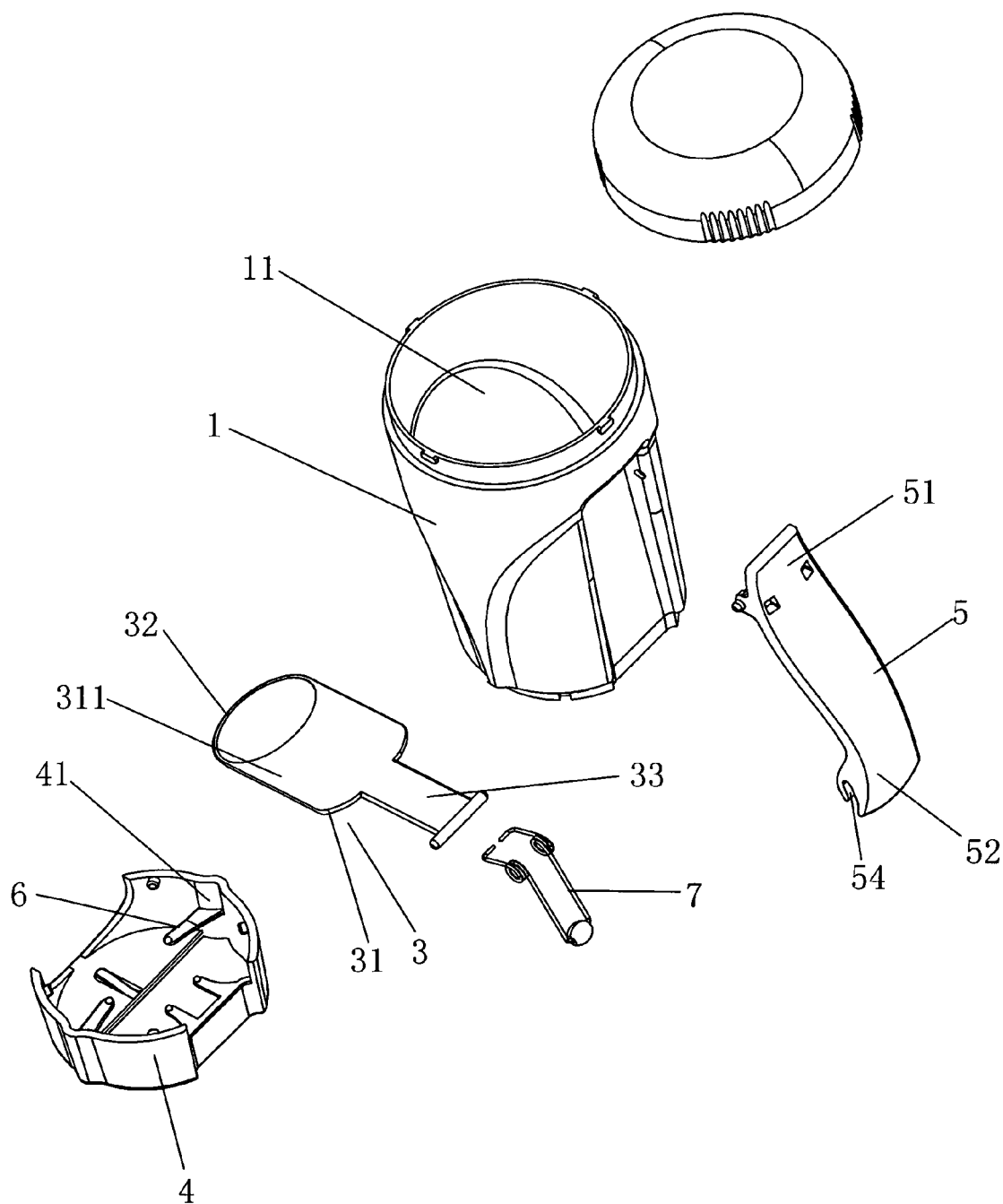
FIG. 16 is an exploded perspective view of a dispenser according to a fourth preferred embodiment of the present invention, illustrating the powder container being supported at an upright position.
Figure 17:
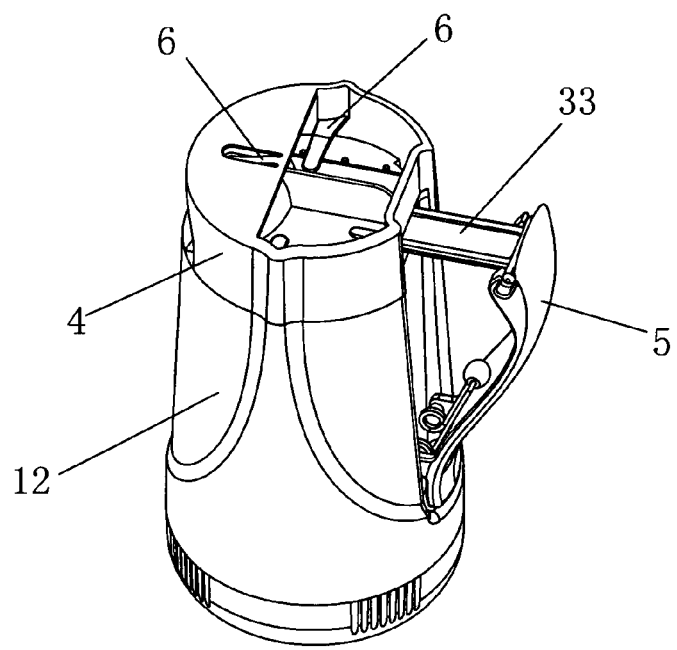
FIG. 17 is a perspective view of the dispenser according to the above fourth preferred embodiment of the present invention, illustrating the device being supported at an inverted position.
Figure 18:
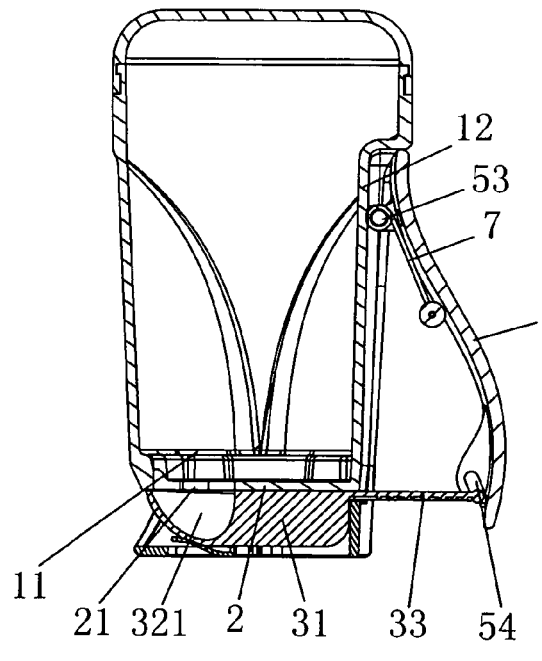
FIG. 18 is a sectional view of the dispenser according to the above fourth preferred embodiment of the present invention, illustrating the slide at the first position.
Figure 19:
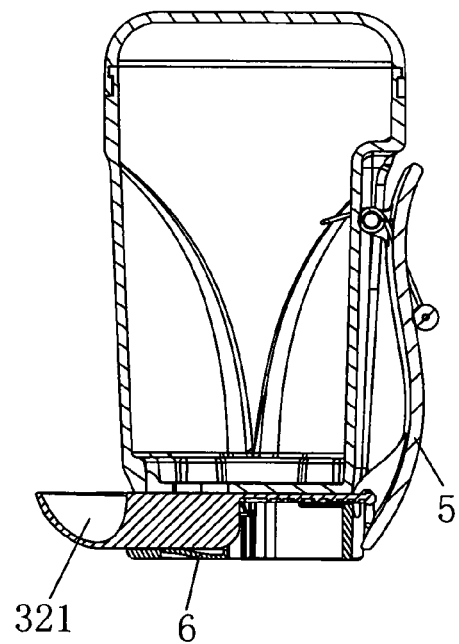
FIG. 19 is a sectional view of the dispenser according to the above fourth preferred embodiment of the present invention, illustrating the slide at the second position.

Referring to FIGS. 1 to 7 of the drawings, a device for measuring and dispensing powder materials according to a first preferred embodiment of the present invention is illustrated, wherein the device, as a dispenser, comprises a powder container 1, a slide housing 2, a slide 3, a cover panel 4, a retention panel 5, and an elastic unit 6. The powder container 1 is adapted for containing the powder materials therein, wherein the powder container 1 has a bottom opening for the powder materials dispensing therefrom. The slide housing 2 has a through powder inlet slot 21 extended through the slide housing 2 along a direction of gravity. Accordingly, an inlet of the powder inlet slot 21 of the slide housing 2 has an engaging rim 22 in circular shape. The inner side of the engaging rim 22 engages with an outer side of the bottom rim of the powder container 1, wherein a plurality of rim clippers 221 are spacedly provided at the inner side of the engaging rim 22 to engage with a plurality of rim slots of the outer side of the bottom rim of the powder container 1 respectively. The slide housing 2 further comprises two parallel guiding panels 23, wherein the guiding panels 23 are spacedly provided at two sides of the outlet of the powder inlet slot 21 of the slide housing 2 to guide the slide 3 in a sliding manner. The outlet of the powder inlet slot 21 has a flat bottom surface 211. The slide housing 2 comprises a first retention member 24 provided adjacent to the outlet of the powder inlet slot 21.

The slide 3 is a one-piece integral member, wherein the slide 3 comprises a blocking panel 31 and a blocking wall 32 having a circular shape formed at a lateral side of the blocking panel 31. The blocking panel 31 has a coupling side 311 which is a flat surface, wherein the coupling side 311 of the blocking panel 31 is engaged with the coupling the flat bottom surface 211 of the slide housing 2 by means of surface-to-surface engagement. The slide 3 further comprises a second retention member 312 protruded from the coupling side 311 of the blocking panel 31 to limit the movement of the slide housing 2. The blocking wall 32 forms a measure slot 321 therewithin, wherein the measure slot 321 is a through slot extended through the slide 3 from top to bottom. The top surface 322 of the measure slot 321 is formed at the coupling side of the blocking panel 31 at a planar direction. The bottom surface 323 of the measure slot 321 is a flat surface being biased against by the elastic unit 6. The cover panel 4 is a thin panel and has two guiding holes 41 spacedly formed thereon. The retention panel 5 comprises a base panel 51 and two side panels 52 upwardly extended from two side edges of the base panel 51 respectively, wherein the base panel 51 has four opening slots 511 and two retention pillars 512. Each of the side panels 52 has a clip slot 521 indently provided at the outer side thereof. Each of the guiding panels 23 has a corresponding clipper 231 engaging with the respective clip slot 521 such that when the clippers 231 are engaged with the clip slots 521 respectively, the side panels 52 are coupled with the guiding panels 23 respectively. The elastic unit 6 comprises four elastic elements 6, wherein the elastic elements 6 are spacedly and integrally extended from the retention panel 5. Accordingly, the retention panel 5 has four slots 511 to form the elastic elements 6 which are extended towards the slide 3. In other words, the free ends of the elastic elements 6 are suspendedly extended from the retention panel 5. According to the first embodiment, each of the elastic elements 6 has an affixing end integrally extended from the retention panel 5 and the free end extended to bias against the slide 3.

In order to assemble the device of the present invention, the rim clippers 221 of the slide housing 2 are engaged with the rim slots of the bottom rim of the powder container 1 respectively to secure the slide housing 2 at the bottom rim of the powder container 1, such that the bottom opening of the powder container 1 communicates with the powder inlet slot 21 of the slide housing 2. By pressing the slide 3 at the slide housing 2, the coupling side 311 of the slide 3 is fittingly biased against the bottom surface 211 of the powder inlet slot 21 of the slide housing 2. The guiding holes 41 of the cover panel 4 are engaged with the retention pillars 512 of the retention panel 5 to retain the cover panel 4 at a position that the free ends of the elastic elements 6 are biased against the cover panel 4. Then, the clippers 231 of the slide housing 2 are engaged with the clip slots 521 of the retention panel 5 respectively to secure the retention panel 5 at the bottom portion of the slide housing 2. Therefore, the elastic elements 6 apply the urging force against the cover panel 4 to fittingly press against the slide 3 so as to ensure the slide 3 being fittingly pressed against the slide housing 2 (i.e. the coupling side 311 of the slide 3 engaging with the bottom surface 211 of the slide housing 2).

Since the slide 3 is slidably engaged with the slide housing 2, the slide 3 is adapted to horizontally slide between the first position and the second position. Accordingly, at the first position, the bottom opening of the powder container 1, the powder inlet slot 21 of the slide housing 2, and the measure slot 321 of the slide 3 are communicated with each other. The bottom side of the measure slot 321 of the slide 3 is covered by the cover panel 4. Therefore, the powder materials in the powder container 1 fill at the measure slot 321 of the slide 3 through the powder inlet slot 21 of the slide housing 2. In other words, the amount of the powder materials filled at the measure slot 321 of the slide 3 will be measured thereat. Then, when the slide 3 is slide horizontally until the second retention member 312 of the slide 3 reaches the first retention member 24 of the slide housing 2, i.e. the second position of the slide 3, the slide 3 is blocked to prevent the further sliding movement with respect to the slide housing 2. At the second position, the measure slot 321 of the slide 3 is moved away from the slide housing 2 at a position that the cover panel 4 unseals the bottom side of the measure slot 321 of the slide 3 in such a manner that the powder materials at the measure slot 321 will be dispensed out of the measure slot 321 of the slide 3.

According to the first embodiment, the slide 3 can be fittingly pressed against the slide housing 2 via the elastic elements 6 when the slide 3 is moved between the first and second positions, so as to minimize the clearance between the slide 3 and the slide housing 2. In other words, the device can prevent the powder material from being leaked through the clearance between the slide 3 and the slide housing 2. Through the urging force of the elastic elements 6, the accuracy between the slide 3 and the slide housing 2 can be reduced and the precision installation of the slide 3 to the slide housing 2 can also be minimized, so as to substantially reduce the manufacturing cost of the device and to facilitate the mass production of the device of the present invention.

As shown in FIGS. 8 to 11, a device for measuring and dispensing powder materials of a second embodiment illustrates an alternative mode of the first embodiment, wherein the device comprises a powder container 1, a slide housing 2, a slide 3, a retention panel 5, and an elastic unit 6. The slide housing 2 has a through powder inlet slot 21 extended through the slide housing 2 along a direction of gravity. An inlet of the powder inlet slot 21 of the slide housing 2 has an engaging rim 22 in circular shape. The inner side of the engaging rim 22 engages with an outer side of the bottom rim of the powder container 1, wherein a plurality of rim clippers are spacedly provided at the inner side of the engaging rim 22 to engage with a plurality of rim slots of the outer side of the bottom rim of the powder container 1 respectively. The slide housing 2 further comprises two parallel guiding panels 23, wherein the guiding panels 23 are spacedly provided at two sides of the outlet of the powder inlet slot 21 of the slide housing 2 to guide the slide 3 in a sliding manner. The slide 3 is a one-piece integral member, wherein the slide 3 comprises a blocking panel 31, a pusher member 33 provided at one lateral side of the blocking panel 31, and a blocking wall 32 having an oval shape formed at another lateral side of the blocking panel 31. The blocking panel 31 has a coupling side 311 which is a flat surface. The blocking wall 32 forms a measure slot 321 therewithin, wherein the measure slot 321 is a through slot extended through the slide 3 from top to bottom. The top surface 322 of the measure slot 321 is formed at the coupling side 311 of the blocking panel 31 at a planar direction. The bottom surface 323 of the measure slot 321 is a flat surface. The retention panel 5 is a thin panel and has a through dispensing slot 51. The elastic unit 6 comprises two elastic elements 6, wherein each of the elastic elements 6 is an elastic strip bent in a predetermined shape to provide a predetermined elastic force. The elastic elements 6 are spacedly and integrally extended from the retention panel 5, wherein each of the elastic elements 6 further comprises a clipping pillar 61 provided at a lateral side of the elastic element 6.

In order to assemble the device of the present invention, the slide 3 is pressed at the slide housing 2 that the coupling side 311 of the slide 3 is fittingly biased against the bottom surface 211 of the powder inlet slot 21 of the slide housing 2. The clipping pillars 61 of the elastic elements 6 are engaged with the clipping slots 231 of the guiding panels 23 of the slide housing 2 respectively, such that the elastic elements 6 apply the urging force against the retention panel 5 to fittingly retain the retention panel 5 at the slide housing 2. Accordingly, a clearance between the retention panel 5 and the slide housing 2 is larger than a length of the originally expanded of each of the elastic elements 6. Therefore, each of the elastic elements 6 will apply a pulling force to press against the retention panel 5 such that the retention panel 5 will press against the bottom surface 323 of the measure slot 321 of the slide 3. The coupling side 311 of the slide will press against the slide housing 2. When the slide 3 is moved at its first position, the powder inlet slot 21 of the slide housing 2 communicates with the measure slot 321 of the slide 3 while the outlet of the measure slot 321 is sealed by the retention panel 5. When the slide 3 is slidably pushed by the pusher member 33 until the pusher member 33 reaches the first retention member 24 of the slide housing 2, i.e. the second position of the slide 3, the slide 3 is blocked to prevent the further sliding movement with respect to the slide housing 2. At the second position, the powder inlet slot 21 of the slide housing 2 is sealed by the blocking panel 31 of the slide 3 while the measure slot 321 of the slide 3 is moved away from the powder inlet slot 21 and is moved to align with the dispensing slot 51 of the retention panel 5 for dispensing the powder materials from the measure slot 321 through the dispensing slot 51 of the retention panel 5.

According to the second embodiment, the slide 3 can be fittingly pressed against the slide housing 2 via the elastic elements 6 when the slide 3 is moved between the first and second positions. Each of the elastic elements 6 has an affixing end affixed at the slide housing 2 and a free end biasing against the retention panel 5 to apply the upward pulling force thereat, such that the slide 3 is fittingly pressed at the slide housing 2 via the elastic elements 6 when the slide 3 is moved between the first and second positions.

As shown in FIGS. 12 to 15, a device for measuring and dispensing powder materials of a third embodiment illustrates an alternative mode of the first and second embodiments, wherein the device comprises a slide housing 2, a slide 3, and an elastic unit 6. The slide housing 2 has a through powder inlet slot 21 extended through the slide housing 2 along a direction of gravity. An inlet of the powder inlet slot 21 of the slide housing 2 has an engaging rim 22 in circular shape. The inner side of the engaging rim 22 engages with an outer side of the bottom rim of the powder container, wherein a plurality of rim clippers 221 are spacedly provided at the inner side of the engaging rim 22 to engage with a plurality of rim slots of the outer side of the bottom rim of the powder container respectively. The slide housing 2 further comprises an axle 23 downwardly extended at a position adjacent to the outlet of the powder inlet slot 21 and a retention member 24 extended spacedly with respect to the axle 23. The slide housing 2 further comprises a surrounding wall 32 having an arc shape, wherein an opening 26 is defined between two ends of the surrounding wall 25 for the slide 3 being slidably rotated in and out through the opening 26. The slide 3 comprises a blocking panel 31 and a blocking wall 32 extended therefrom, wherein the blocking panel 31 has a coupling side 311 which is a flat surface. The top side 322 of the blocking wall 32 is aligned with the coupling side 311 of the blocking panel 31 at the same planar manner. The surrounding wall 32 forms a measure slot 321 therewithin, wherein the measure slot 321 is a blind slot. The blocking wall 32 further comprises an installing panel 324 horizontally extended therefrom, wherein the installing panel 324 has a rotating slot 325 formed thereat and three retention members 326 spacedly formed at the installing panel 324 around the rotating slot 325. The elastic unit 6 has an affixing end 61 and two free ends 62, wherein a rotating hole 611 is formed at the affixing end 61 of the elastic unit 6. Three retention holes 612 are spacedly formed at the affixing end 61 of the elastic unit 6 around the rotating hole 611.

In order to assemble the device of the present invention, the slide housing 2 is coupled with the bottom side of the powder container. The slide 3 and the elastic unit 6 are coupled at the axle 23 of the slide housing 2 respectively, wherein the axle 23 is inserted into the rotating slot 325 of the slide 3 and the rotating hole 611 of the elastic unit 6. It is worth to mention that the slide 2 can be slidably rotated with respect to the slide housing 3 while the elastic unit 6 is non-rotatably coupled with the slide housing 3. After the axle 23 is inserted into the rotating slot 325 of the slide 3 and the rotating hole 611 of the elastic unit 6, a cap lock 27 is securely coupled with the axle 23 for preventing the slide 3 and the elastic unit 6 from being detached from the slide housing 2. Accordingly, the slide 3 is adapted to slidably rotate with respect to the slide housing 2 between the first position and the second position. At the first position of the slide 3, the powder inlet slot 21 of the slide housing 2 alignedly communicates with the measure slot 321 of the slide 3 such that the powder materials are filled in the measure slot 321 and are measured thereby. Accordingly, the slide 3 is blocked by the retention member 24 of the slide housing 2 at the first position. When the slide 3 is slidably rotated with respect to the axle 23, the slide 3 is driven to rotate within the opening 26 until the blocking wall 32 of the slide 3 is blocked by the respective end of the surrounding wall 25. The slide 3 is blocked for further rotational movement and the slide 3 is at the second position. At the second position, the powder inlet slot 21 of the slide housing 2 is sealed by the blocking panel 31 while the measure slot 321 is moved away from the power inlet slot 21. Then, the device of the present invention can be placed at a slanted orientation for dispensing the powder materials from the measure slot 321.

According to the third embodiment, the elastic element 6 has the affixing end coupled at the slide housing 2 and the free end biasing against the slide 3 to apply the upward pulling force thereat, such that the coupling side 311 of the slide 3 is fittingly pressed at the slide housing 2 via the elastic elements 6 when the slide 3 is moved between the first and second positions, so as to minimize the clearance between the slide 3 and the slide housing 2.

As shown in FIGS. 16 to 19, a device for measuring and dispensing powder materials of a fourth embodiment illustrates an alternative mode of the first to third embodiments, wherein the device comprises a powder container 1, a slide housing 2, a slide 3, a cover panel 4, a pusher handle 5, and an elastic unit 6. The powder container 1 is adapted for containing the powder materials therein, wherein the powder container 1 has a bottom opening 11 for the powder materials dispensing therefrom. The slide housing 2 is integrally formed at the bottom side of the powder container 1 to form a one-piece integral member. The bottom opening 11 of the powder container 1 is aligned with the powder inlet slot 21 of the slide housing 2. The slide 3 comprises a blocking panel 31, a blocking wall 32 extended from one side of the blocking panel 31, and a pusher lever 33 extended from another side of the blocking panel 31. The blocking panel 31 has a coupling side 311 which is a flat surface. The blocking wall 32 forms a measure slot 321 therewithin. The cover panel 4 has a plurality of through slots 41. The elastic unit 6 is coupled with the cover panel 4 at each of the through slots 41, such that the elastic unit 6 is inclinedly supported at a suspended manner. The pusher handle 5 comprises a pusher head 51 and a pusher tail 52, wherein the pusher head 51 of the pusher handle 5 is pivotally coupled with the outer wall 12 of the powder container 1 via a pivot axle 53. A clipping slot 54 is provided at the pusher tail 52 of the pusher handle 5. A resilient element 7 is provided between the pusher handle 5 and the outer wall 12 of the powder container 1 for applying an urging force against the pusher handle 5. Accordingly, a mid-portion of the resilient element 7 is coupled at the pivot axle 53 while two end portions of the resilient element 7 bias against the outer wall 12 of the powder container 1 and the inner side of the pusher handle 5 respectively.

After the powder container 1 is installed, the cover panel 4 is coupled with the slide housing 2, wherein the slide 3 is mounted between the cover panel 4 and the slide housing 2 and is pressed by the elastic unit 6 so as to ensure the coupling side 311 of the slide 3 is pressed on the slide housing 2. The pusher lever 33 of the slide is coupled with the clipping slot 54 of the pusher handle 5. According to the fourth embodiment, the elastic unit 6 has an affixing end affixed to the cover panel 4 and a free end extended to bias against the slide 3.

When the slide 3 is retained at the first position, the measure slot 321 of the slide 3 alignedly communicates with the powder inlet slot 21 of the slide housing 2. When the pusher tail 52 of the pusher handle 5 is driven to pivotally press towards the powder container 1, the slide 3 is driven to slide horizontally. When the slide 3 is moved at the second position, the powder inlet slot 21 of the slide housing 2 is sealed by the blocking wall 31 while the measure slot 321 is moved away from the powder inlet slot 21 of the slide housing 2. Therefore, the device of the present invention can be placed at a slanted orientation for dispensing the powder materials from the measure slot 321. Once the pressing force at the pusher handle 5 is released, the pusher handle 5 is pivotally moved back to its position via the resilient element 7 so as to move the slide 3 back to the first position.

It is worth to mention that the user is able to dispense the powder material via the actuation of the pusher handle 5.

According to the fourth embodiment, it is appreciated that the affixing end of the elastic unit 6 can be coupled at the powder container 1 while the free end of the elastic unit 6 is extended to upwardly pull the slide 3 so as to ensure the coupling side 311 of the slide 3 being fittingly pressed at the slide housing 2.

Figure 20:
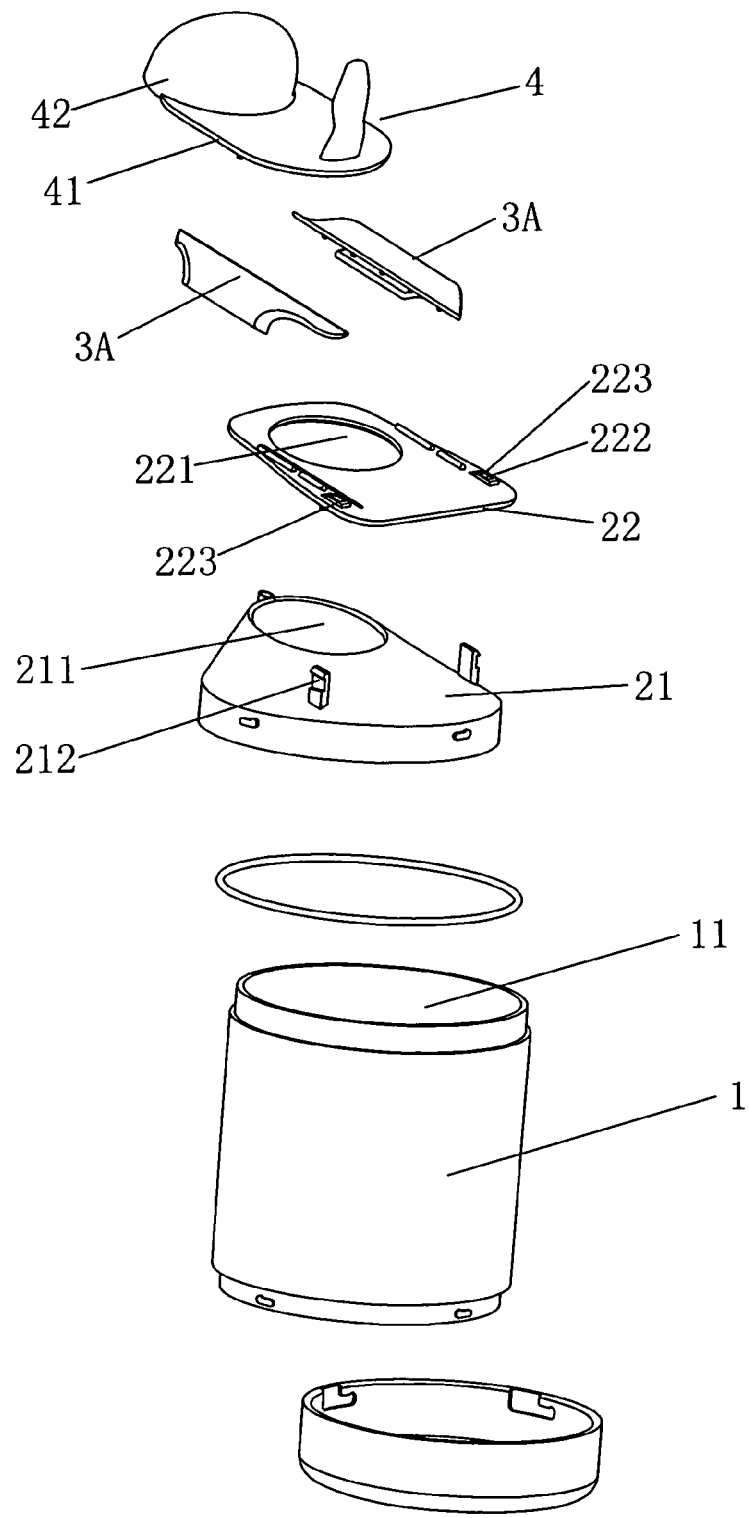
FIG. 20 is an exploded perspective view of a dispenser according to a fifth preferred embodiment of the present invention, illustrating the device being supported at an inverted position.
Figure 21:
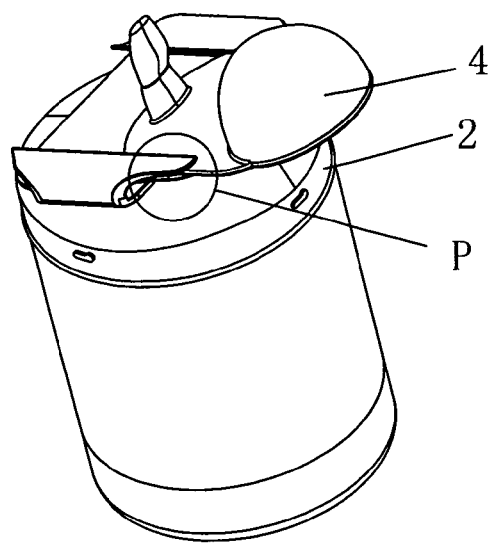
FIG. 21 is a perspective view of the dispenser according to the above fifth preferred embodiment of the present invention, illustrating the device being supported at an inverted position.
Figure 22:
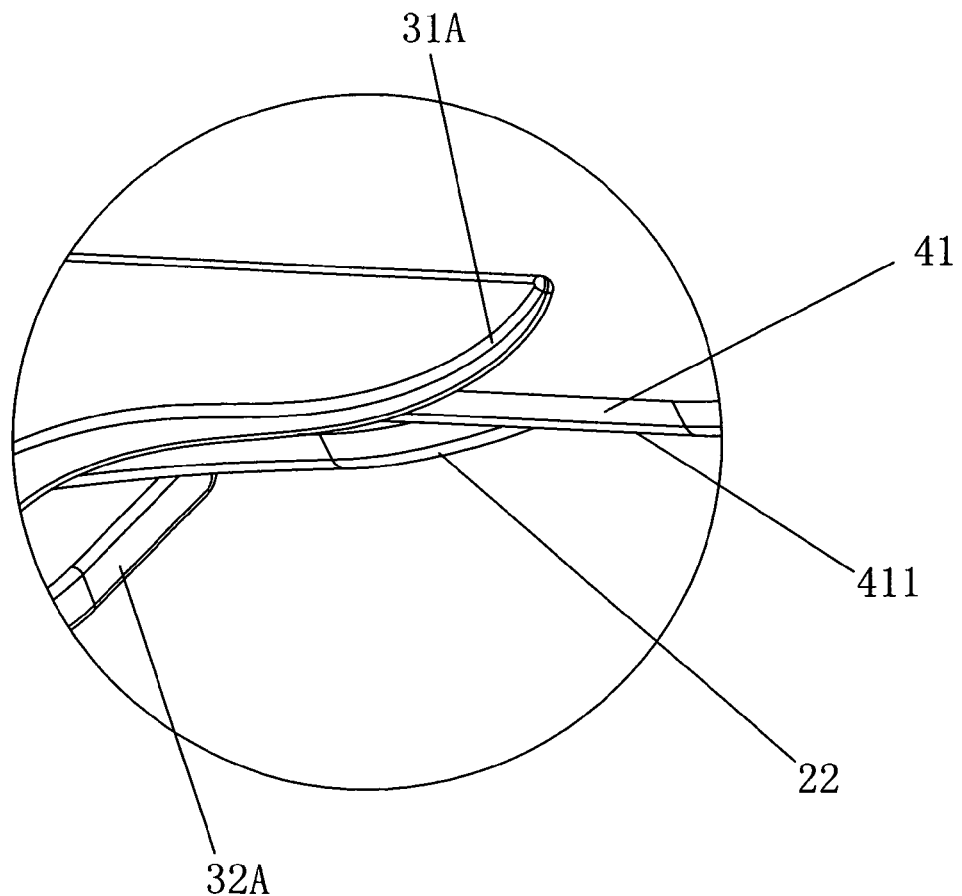
FIG. 22 is a partially enlarged view of the dispenser according to the above fifth preferred embodiment of the present invention.
Figure 23:
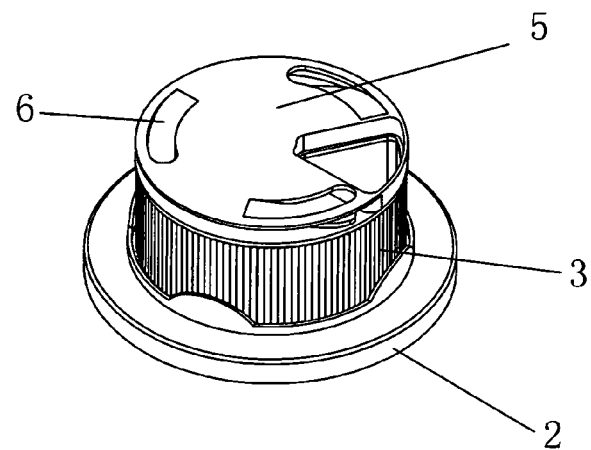
FIG. 23 is a perspective view of a dispenser according to a sixth preferred embodiment of the present invention, illustrating the slide at the first position.
Figure 24:
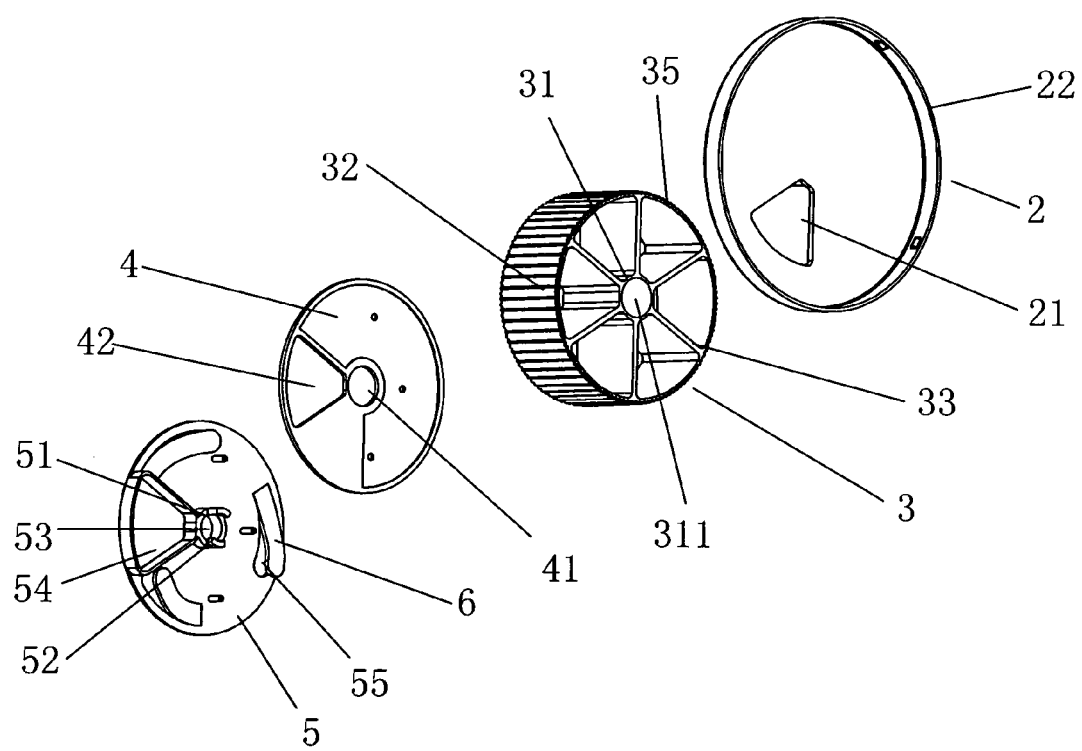
FIG. 24 is an exploded perspective view of the dispenser according to the above sixth preferred embodiment of the present invention, wherein the powder container is omitted in FIG. 24.
Figure 25:
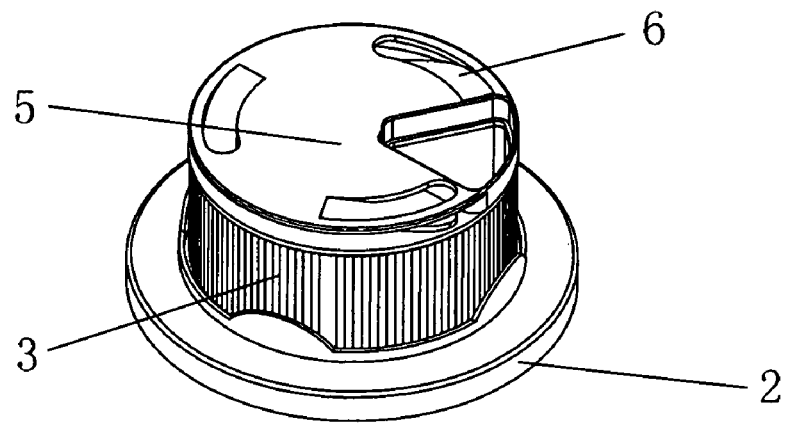
FIG. 25 is a perspective view of the dispenser according to the above sixth preferred embodiment of the present invention, illustrating the slide at the second position.
Figure 26:
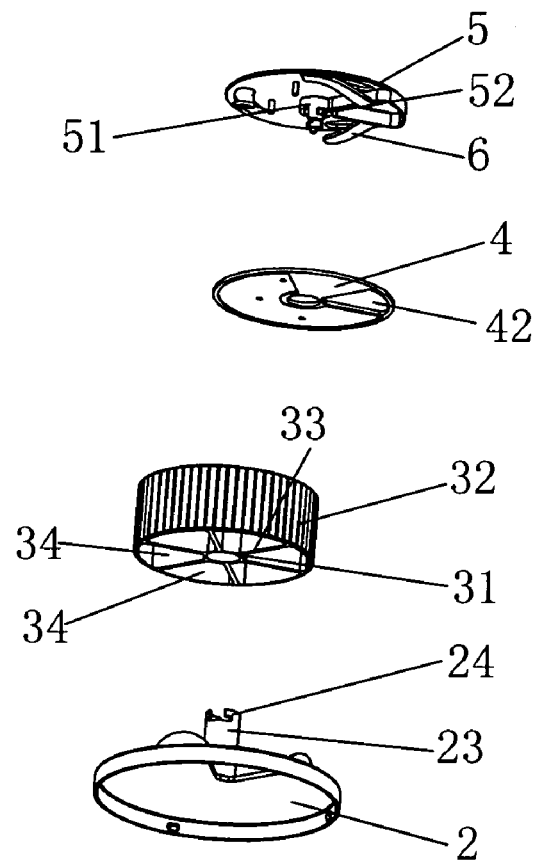
FIG. 26 is another exploded perspective view of the dispenser according to the above sixth preferred embodiment of the present invention, wherein the powder container is omitted in FIG. 26.
Figure 27:
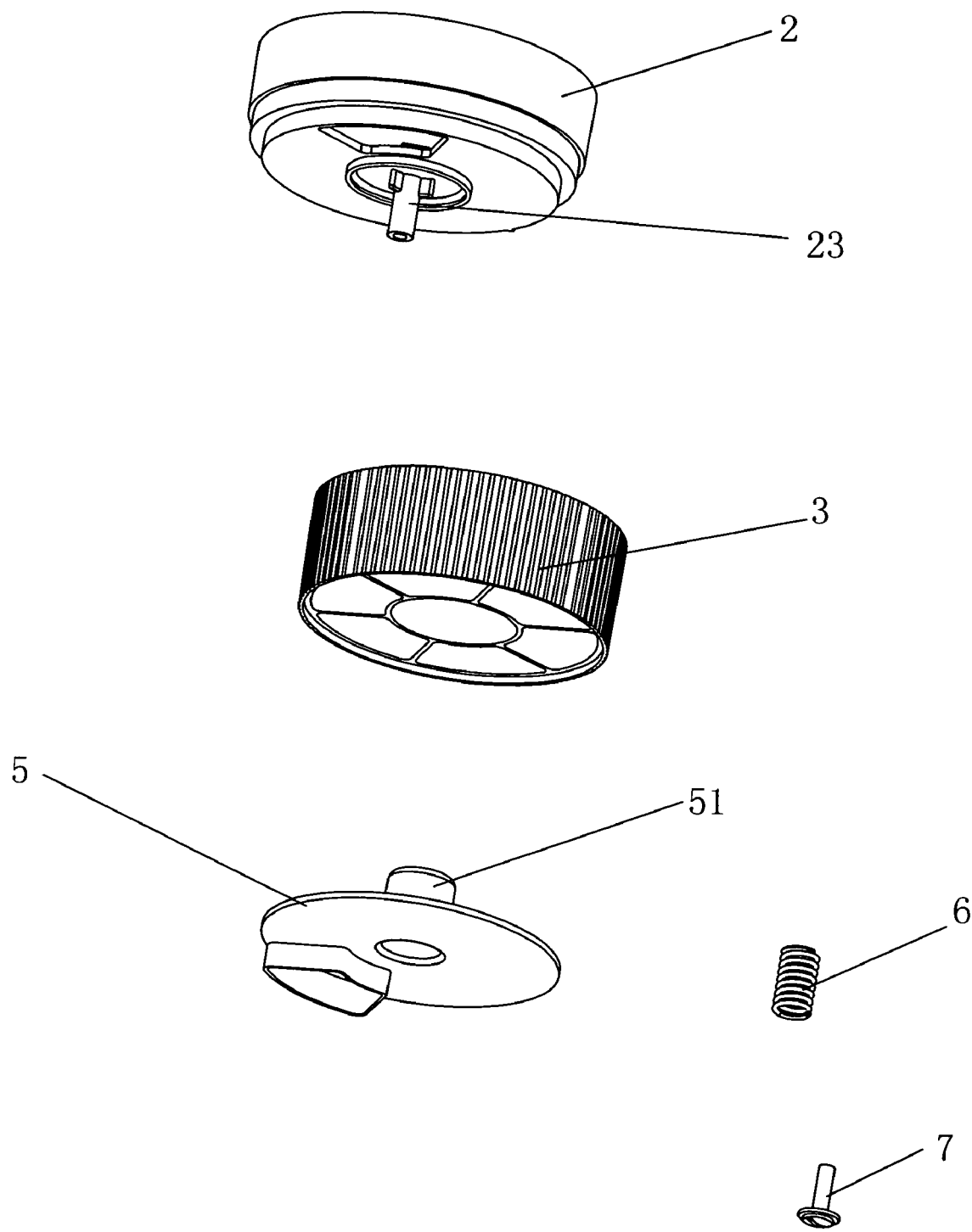
FIG. 27 is a top exploded perspective view of a dispenser according to a seventh preferred embodiment of the present invention, wherein the powder container is omitted in FIG. 27.
Figure 28:
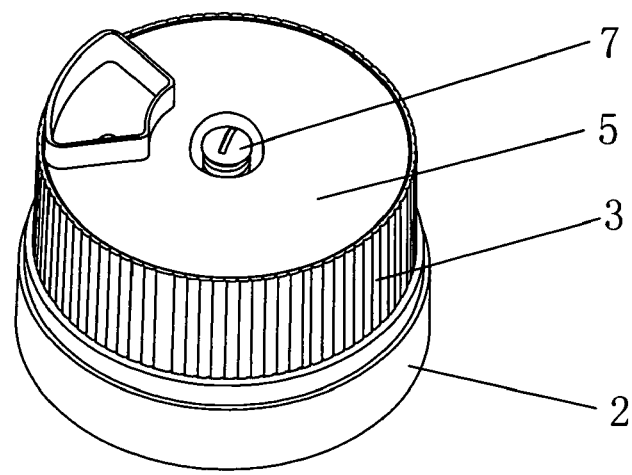
FIG. 28 is a bottom perspective view of the dispenser according to the above seventh preferred embodiment of the present invention, wherein the powder container is omitted in FIG. 28.
Figure 29:
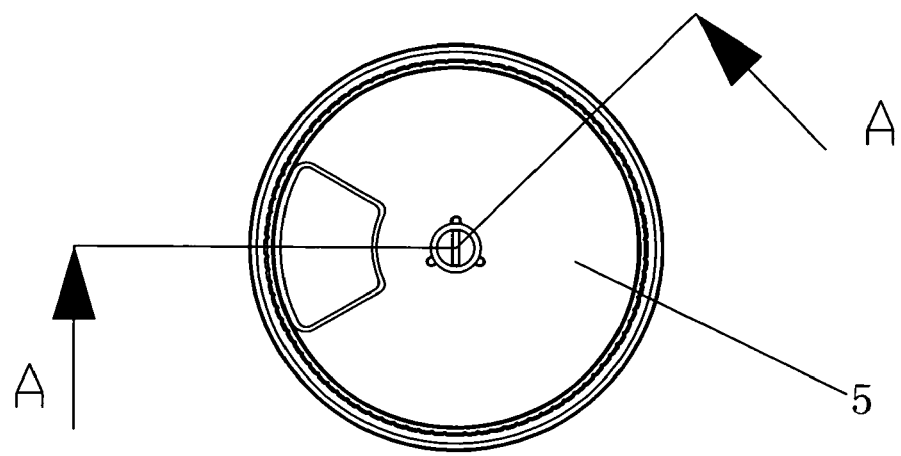
FIG. 29 is a bottom view of the dispenser according to the above seventh preferred embodiment of the present invention.
Figure 30:
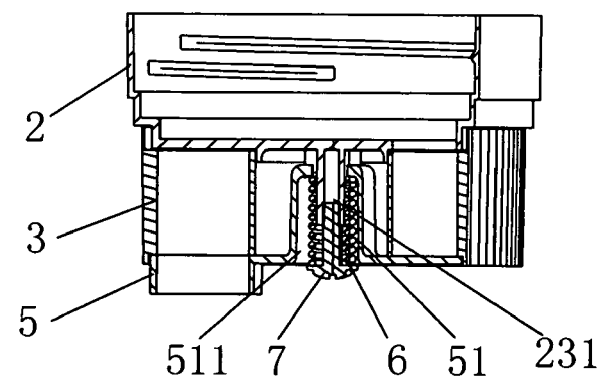
FIG. 30 is a sectional view of the dispenser according to the above seventh preferred embodiment of the present invention.
Figure 31:
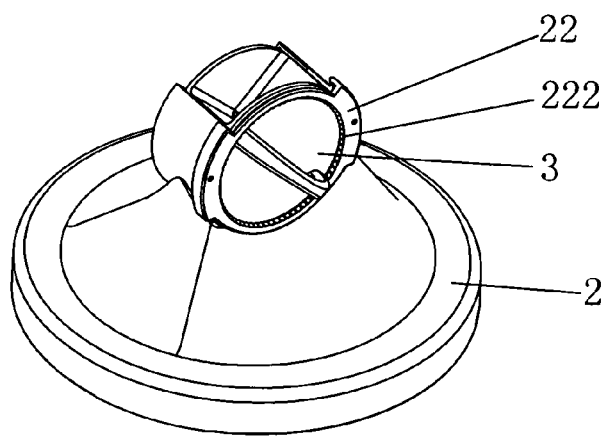
FIG. 31 is a bottom perspective view of a dispenser according to an eighth preferred embodiment of the present invention, illustrating the slide at the first position, wherein the powder container is omitted in FIG. 31.
Figure 32:
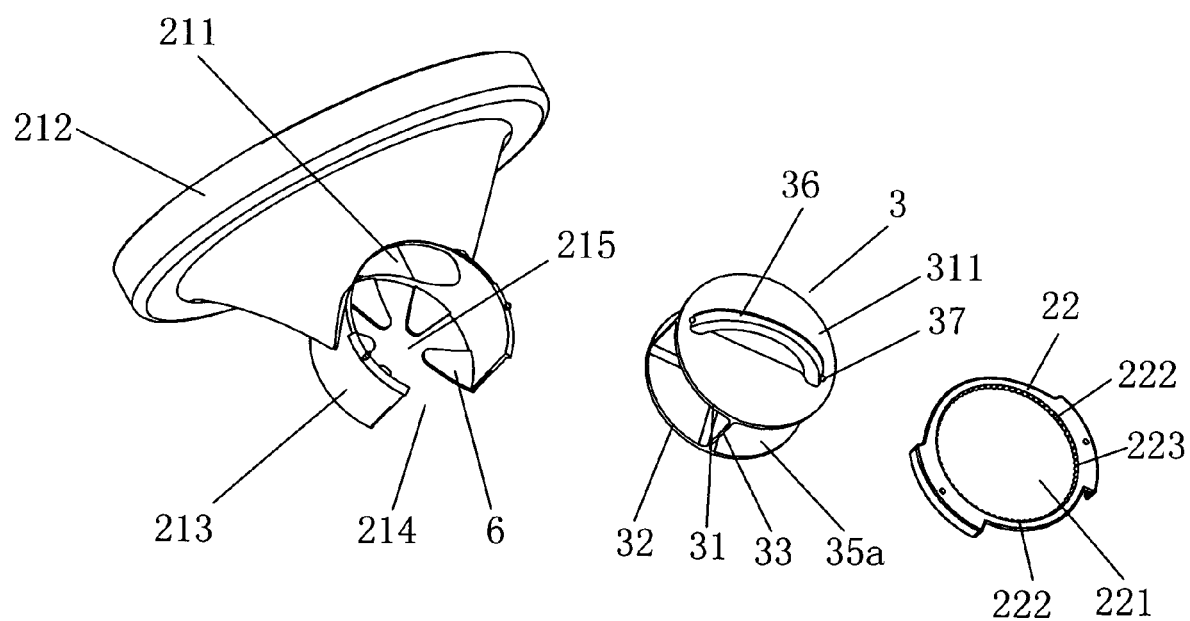
FIG. 32 is an exploded perspective view of the dispenser according to the above eighth preferred embodiment of the present invention, wherein the powder container is omitted in FIG. 32.
Figure 33:
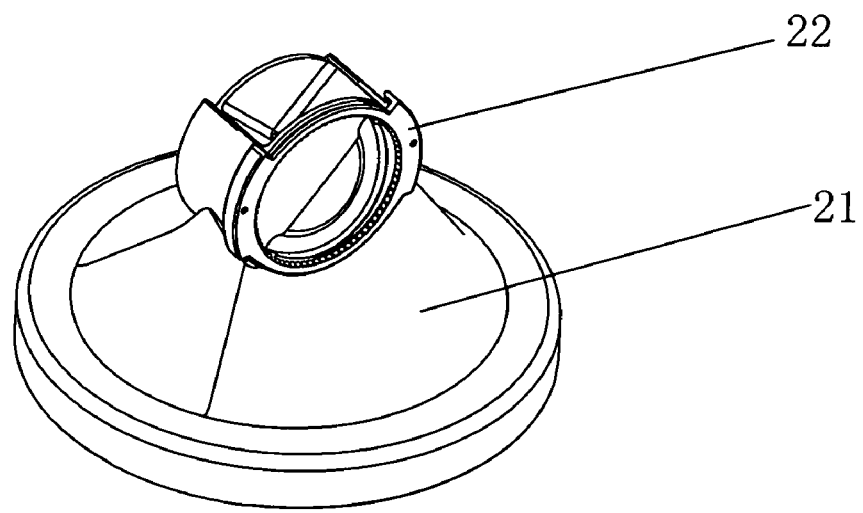
FIG. 33 is a bottom perspective view of the dispenser according to the above eighth preferred embodiment of the present invention, illustrating the slide being rotated 90°, wherein the powder container is omitted in FIG. 33.
Figure 34:
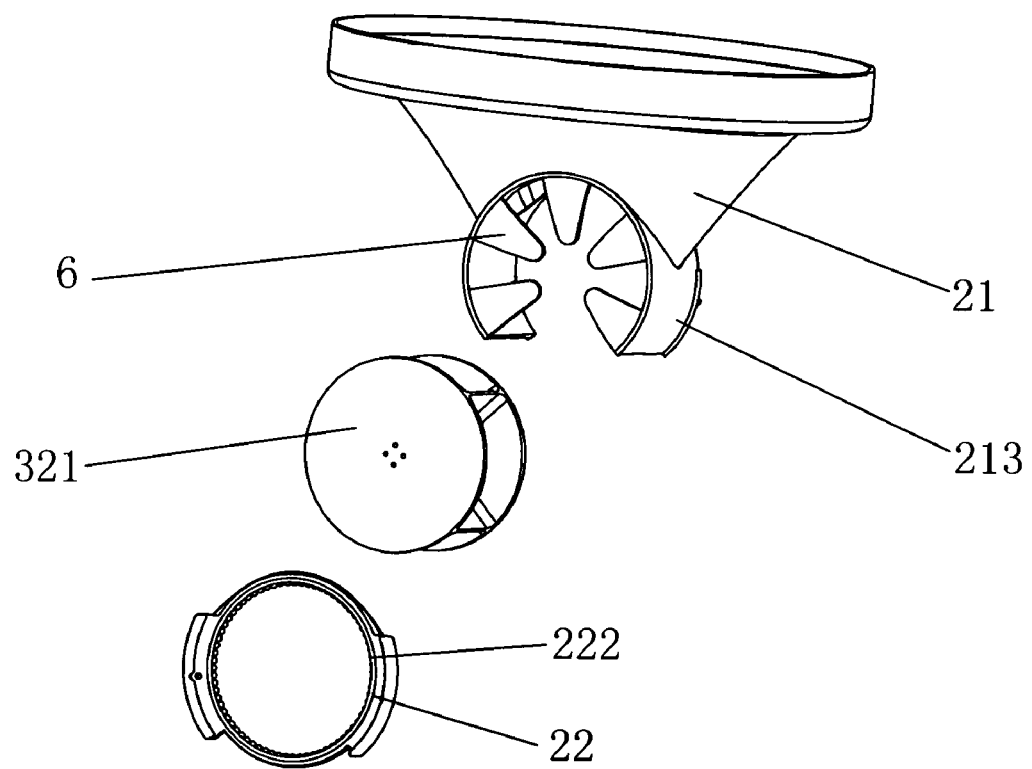
FIG. 34 is another exploded perspective view of the dispenser according to the above eighth preferred embodiment of the present invention, wherein the powder container is omitted in FIG. 34.
Figure 35:
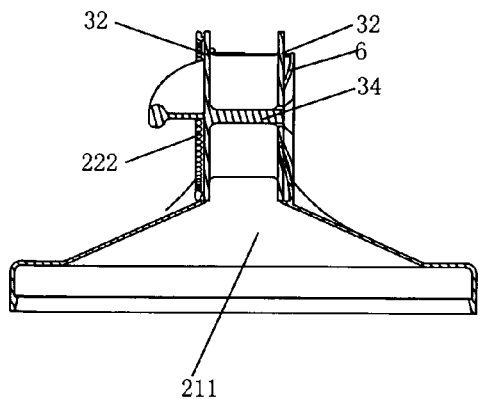
FIG. 35 is a sectional view of a dispenser according to the above eighth preferred embodiment of the present invention, illustrating the slide at the first position.
Figure 36:
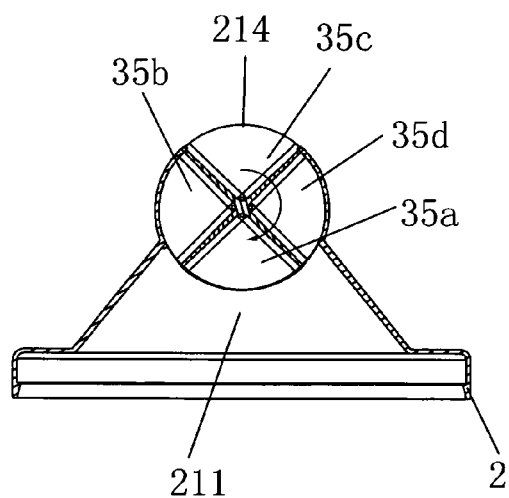
FIG. 36 is a front view of the dispenser according to the above eighth preferred embodiment of the present invention, illustrating the slide at the first position.
Figure 37:
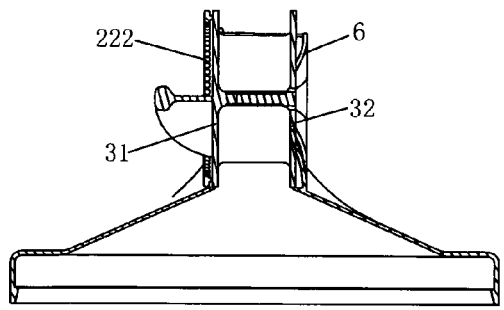
FIG. 37 is a sectional view of the dispenser according to the above eighth preferred embodiment of the present invention, illustrating the slide being rotated 90°.
Figure 38:
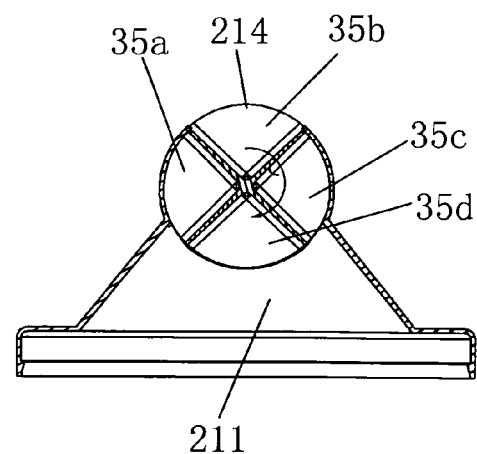
FIG. 38 is a front view of the dispenser according to the above eighth preferred embodiment of the present invention, illustrating the slide being rotated 90°.

As shown in FIGS. 20 to 22, a device for measuring and dispensing powder materials of a fifth embodiment illustrates an alternative mode of the first to fourth embodiments, wherein the device comprises a powder container 1, a slide housing 2, an elastic unit 3A, and a slide 4. The powder container 1 is adapted for containing the powder materials therein, wherein the powder container 1 has a bottom opening 11 for the powder materials dispensing therefrom. The slide housing 2 comprises a slide body 21 and a retention panel 22. The slide body 21 is coupled at the bottom side of the powder container 1, wherein the slide body 21 has a powder inlet slot 211 aligned with the bottom opening 11 of the powder container 1. The slide body 21 further comprises two inverting hooks 212 extending spacedly and vertically. The retention panel 22, which is a thin panel, has a through slot 221 aligned with the powder inlet slot 211, two spaced apart hooking slots 222 aligned with the inverting hooks 212, and two hook lockers 223 provided at the hooking slots 222 respectively. For installation, the inverting hooks 212 of the slide body 21 are extended through the hooking slots 222 of the retention panel 22 to engage with the hook lockers 223 respectively, such that the retention panel 22 is securely coupled at the bottom side of the slide body 21 so as to ensure the through slot 221 of the retention panel 22 being aligned with the powder inlet slot 211 of the slide body 21. The slide 4 is coupled at the bottom side of the retention panel 22, wherein the slide 4 comprises a blocking panel 41 and a blocking wall 42 extended from one side of the blocking panel 41. The blocking panel 41 has a coupling side 411 which is a flat surface. A measure slot is formed within the blocking wall 42. The elastic unit 3A comprises two elastic elements 3A each having a U-shaped cross section. Each of the elastic elements 3A comprises a first holding panel 31A and a second holding panel 32A spacedly apart from the first holding panel 31A, wherein each of the elastic elements 3A clamps with side edges of the retention panel 22 and the blocking panel 41 at a position that the side edges of the retention panel 22 and the blocking panel 41 are sandwiched between the first and second holding panels 31A, 32A, such that the coupling side 411 of the slide 4 is fittingly pressed against the retention panel 22.

As shown in FIGS. 23 to 26, a device for measuring and dispensing powder materials of a sixth embodiment illustrates an alternative mode of the first to fifth embodiments, wherein the device comprises a slide housing 2, a slide 3, a cover panel 4, a retention panel 5, and an elastic unit 6. The slide housing 2 has a through powder inlet slot 21 extended through the slide housing 2 along a direction of gravity. Accordingly, an inlet of the powder inlet slot 21 of the slide housing 2 has an engaging rim 22 in circular shape. The slide housing 2 further comprises an axle 23 downwardly extended therefrom at a position adjacent to the powder inlet slot 21, wherein a clipper 24 is provided at a free end of the axle 23. The slide 3 comprises a ring-shaped inner wall 31 and a ring-shaped outer wall 32, wherein a rotating slot 311 is provided at a center of the inner wall 31. The slide 3 further comprises six blades 33 outwardly and radially extended from the inner wall 31 to the outer wall 32 to coaxially couple the inner wall 31 with the outer wall 32, wherein six measure slots 34 are formed by the six blades 33 that each measure slot 34 is defined between every two neighboring blades 33. In addition, each of the measure slots 34 is a through slot. The cover panel 4, which is a thin circular panel, has a center rotating hole 41 and a dispensing opening 42 positioned adjacent to the rotating hole 41. The retention panel 5, which is also a thin circular panel, comprises a center retention pillar 51 and a clipping slot 52 provided at a free end of the retention pillar 51. The retention pillar 51 has a hollow shape and forms a center rotating groove 53 at the retention pillar 51. A second dispensing opening 54 is formed at the retention panel 5 at a position adjacent to the retention pillar 51. The elastic unit 6 comprises three elastic elements 6 integrally formed at the retention panel 5 to form a one-piece integral member, wherein the elastic elements 6 are formed at three opening slots 55 of the retention panel 5 and are upwardly extended in a suspended manner.

In order to assemble the device of the present invention, the slide housing 2 is mounted at the bottom rim of the powder container. The rotating slot 311 of the slide 3, the rotating hole 41 of the cover panel 4, and the rotating groove 53 of the retention panel 5 are respectively mounted at the axle 23 of the slide housing 2, wherein the clipper 24 is then engaged with the clipping slot 52 of the retention panel 5. After the installation, the first dispensing opening 42 of the cover panel 4 communicates with the second dispensing opening 54 of the retention panel 5, wherein the elastic elements 6 apply the urging force against the cover panel 4 to press the cover panel 4 at the slide 3.

According to the sixth embodiment, the slide 3 is slidably rotated with respect to the slide housing 2. Through the rotational movement of the slide 3, the six measure slots 34 can be selectively adjusted to align with the powder inlet slot 21. Accordingly, when the slide 3 is slidably rotated from the first position to the second position, i.e. six positions, one of the measure slots 34 will be aligned with the powder inlet slot 21 while another measure slot 34 will be aligned with the second dispensing opening 54. The slide 3 has a coupling side 35 fittingly presses at the slide housing 2, wherein the elastic elements 6 apply the urging force against the slide 3 to ensure the coupling side 35 fittingly pressing at the slide housing 2, so as to minimize the clearance between the slide 3 and the slide housing 2.

As shown in FIGS. 27 to 30, a device for measuring and dispensing powder materials of a seventh embodiment illustrates an alternative mode of the sixth embodiment, wherein the device of the seventh embodiment is the same as that of the sixth embodiment, except the elastic unit 6 is an individual component supported between the slide 3 and the slide housing 2. Accordingly, the elastic unit 6 is a compression spring, wherein the cover panel 4 is omitted in the seventh embodiment. The slide housing 2 comprises an axle 23 extended downwardly and vertically, wherein the axle 23 has an inner threaded slot 231 formed at the free end of the axle 23. The retention panel 5 comprises a mounting pillar 51 extended towards the slide housing 2, wherein the mounting pillar 51 has a hollow shape and defines a receiving cavity 511 along the mounting pillar 51. For installation, the compression spring 6 is disposed within the receiving cavity 511 of the mounting pillar 51, wherein the axle 23 is coaxially passed through the receiving cavity 511. Accordingly, the compression spring 6 is coaxially mounted at the axle 23 and locked by coupling a screw 7 at the inner thread slot 231 of the axle 23, so as to retain the compression spring 6 in position. Then, the slide housing 2, the slide 3, and the retention panel 5 can be coupled with each other. The compression spring 6 will apply the urging force against the slide 3 to ensure the slide 3 being pressed at the slide housing 2.

As shown in FIGS. 31 to 38, a device for measuring and dispensing powder materials of an eighth embodiment illustrates an alternative mode of the above embodiments, wherein the device comprises a slide housing 2, a slide 3, and an elastic unit 6. The slide housing 2 comprises a slide body 21 and a cover panel 22, wherein the slide body 21 has a through powder inlet slot 211 extended through the slide body 21 along a direction of gravity. Accordingly, an outlet of the powder inlet slot 21 of the slide housing 2 has an engaging rim 212 in circular shape to couple with the bottom side of the powder container. Two arc-shaped blocking walls 231 are spacedly formed adjacent to the outlet of the powder inlet slot 211 to define a dispensing opening 214 between two ends of the blocking walls 231 and a rotating cavity 215 within the blocking walls 231 which has either a circular shape or oval shape. The axis of the rotating cavity 215 is perpendicular to the direction of gravity. The cover panel 22 has a through hole 221, wherein a plurality of bearings 222 are spacedly formed at the rim of the through hole 221. Each of the bearings 222 has a ball shape, wherein an indent groove 223 is formed between every two neighboring bearings 222, such that the cover panel 22 has a plurality of indention surfaces and corresponding protrusion surfaces provided around the through hole 221 in an alternated manner. A diameter of the slide 3 is larger than a size of the dispensing opening 214 of the slide housing 2 to prevent the slide 3 from being detached therefrom. The slide 3 comprises a left side panel 31, a right side panel 32, and four blades 33 radially extended between the left and right side panels 31, 32 to couple the left side panel 31 with the right side panel 32. A connecting axle 34 is extended between the left and right side panels 31, 32 that the blades 33 are extended from the connecting axle 34. In addition, four measure slots 35a, 35b, 35c, 35d are formed by the blades 33 that each of the measure slots 35a, 35b, 35c, 35d is formed between every two of the blades 33. A rotation button 36 is provided at one side of the left side panel 31 for the user to rotate the slide 3. A guiding protrusion 37 is provided at the left side panel 31 at a position adjacent to the rotation button 36. The elastic unit 6 comprises a plurality of elastic elements radially and inwardly extended from the blocking walls 213, wherein each of the elastic elements 6 has an affixing end extended from the respective blocking wall 213 and a free end extended towards the center of the rotating cavity 215 in a suspended manner.

In order to assemble the device of the present invention, the slide 3 is horizontally disposed within the rotating cavity 215, wherein the cover panel 22 is locked at the side of the slide body 21 to retain the slide 3 at a position between the cover panel 22 and the elastic unit 6. When the slide 3 is rotated, the guiding protrusion 37 of the slide 3 is slid at the surfaces of the bearings 222 of the slide housing 2. When the guiding protrusion 37 is slid at one of the indention surface of the slide housing 2, the slide 3 is horizontally shifted. At the same time, the elastic elements 6 apply the urging force against the right side panel 32 of the slide 3. Therefore, during the rotational movement of the slide 3, the slide 3 is kept moving left and right to shake the slide 3 at the horizontal direction so as to minimize the clearance between the slide 3 and the slide housing 2 and to enhance the powder materials being dispensed through the vibration of the slide 3.

According to the eighth embodiment, the outer side of the left side panel 31 of the slide 3 is contacted with the cover panel 22, wherein the outer side of the left side panel 31 is the coupling side 311 thereof. The outer side 321 of the right side panel 32 is contacted with the elastic unit 6, wherein the elastic element 6 has an affixing end coupled with the slide housing 2 to prevent the coupling side 311 from being moved, and a free end for applying the urging force at the slide 3 to ensure the slide 3 being fittingly pressed at the slide housing 2.

According to the eighth embodiment, the slide 3 is slidably rotated with respect to the slide housing 2 between the first and second positions. At the first position, one of the measure slots 35a is aligned with the powder inlet slot 211 for inputting the powder materials. Another measure slot 35c is aligned with the dispensing opening 214 for dispensing the powder materials. When the slide 3 is rotated at 90°, the measure slot 35d is aligned with the powder inlet slot 211 for inputting the powder materials while the measure slot 35b is aligned with the dispensing opening 214 for dispensing the powder materials. When the slide 3 is kept rotating at 90°, i.e. the second position of the slide 3, the measure slot 35c is aligned with the powder inlet slot 211 for inputting the powder materials while the measure slot 35a is aligned with the dispensing opening 214 for dispensing the powder materials.

Figure 39:
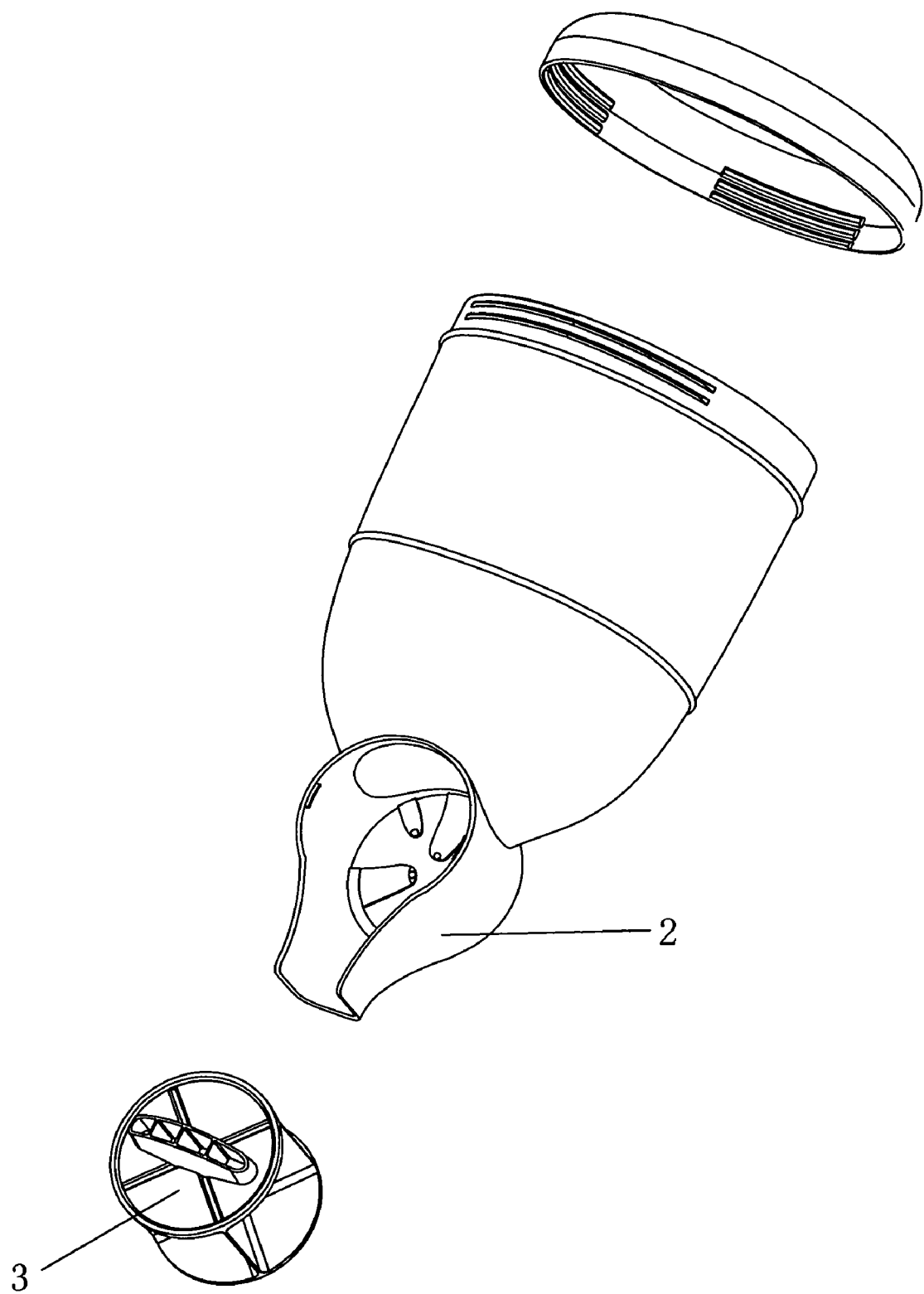
FIG. 39 is an exploded perspective view of a dispenser according to a ninth preferred embodiment of the present invention.
Figure 40:
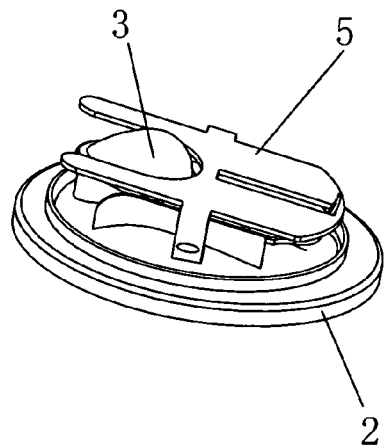
FIG. 40 is a bottom perspective view of the dispenser according to a tenth preferred embodiment of the present invention, illustrating the slide at the first position, wherein the powder container is omitted in FIG. 40.
Figure 41:
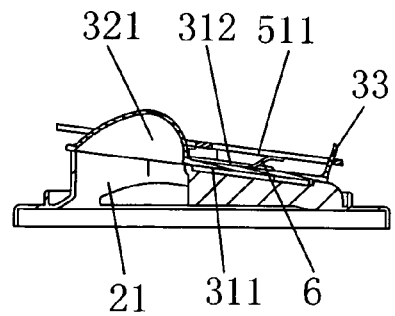
FIG. 41 is a sectional view of the dispenser according to the above tenth preferred embodiment of the present invention, illustrating the slide at the first position, wherein the powder container is omitted in FIG. 41.
Figure 42:
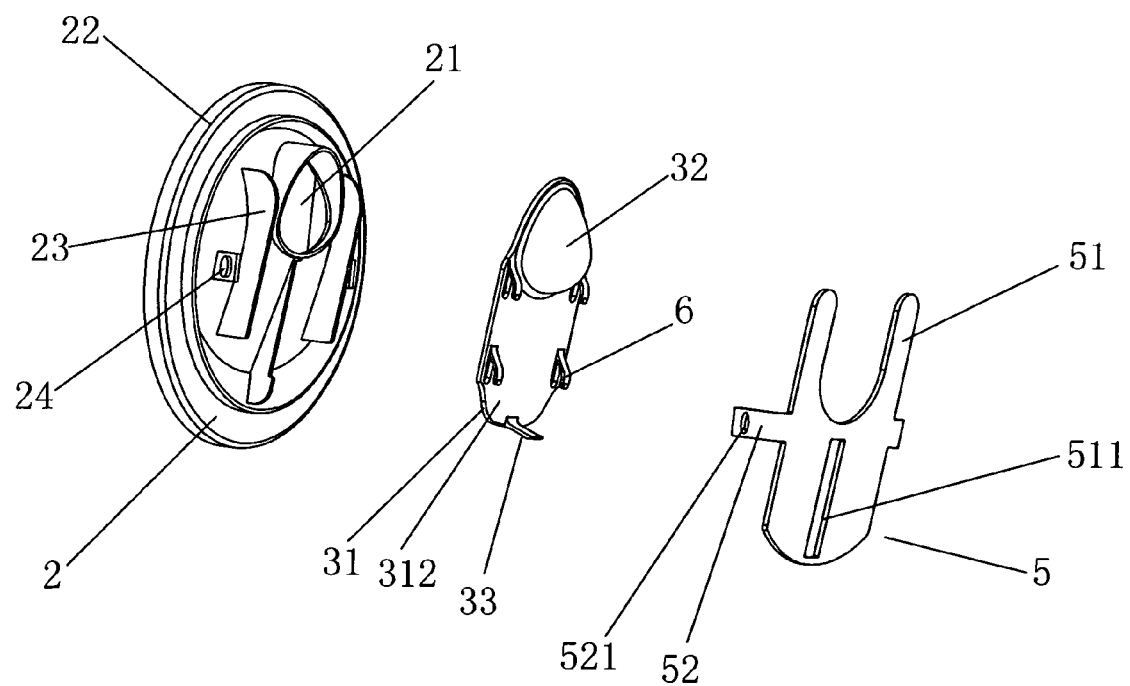
FIG. 42 is an exploded perspective view of the dispenser according to the above tenth preferred embodiment of the present invention, wherein the powder container is omitted in FIG. 42.
Figure 43:
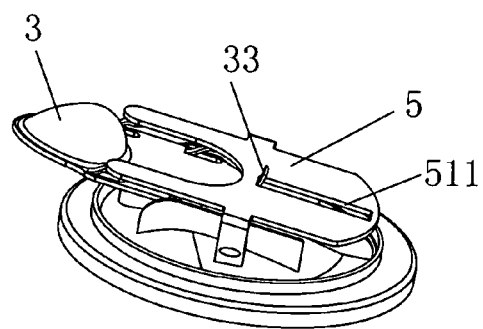
FIG. 43 is a bottom perspective view of the dispenser according to the above tenth preferred embodiment of the present invention, illustrating the slide at the second position, wherein the powder container is omitted in FIG. 43.
Figure 44:
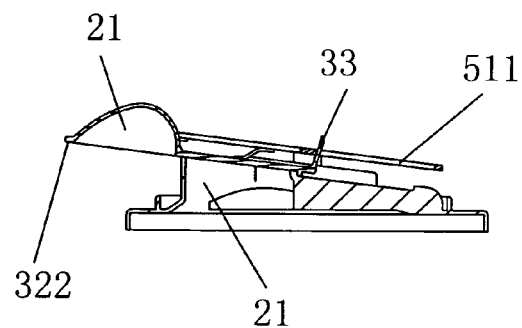
FIG. 44 is a sectional view of the dispenser according to the above tenth preferred embodiment of the present invention, illustrating the slide at the second position, wherein the powder container is omitted in FIG. 44.
Figure 45:
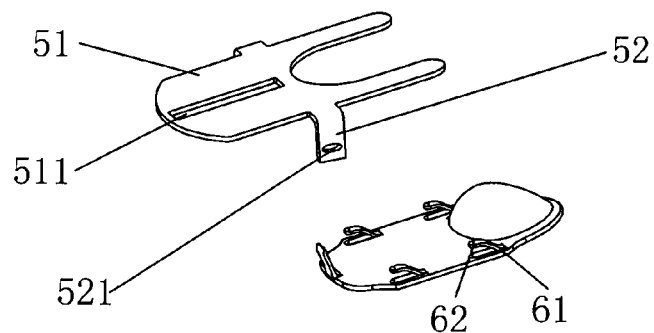
FIG. 45 is another exploded perspective view of the dispenser according to the above tenth preferred embodiment of the present invention, wherein the powder container is omitted in FIG. 45.
Figure 45:
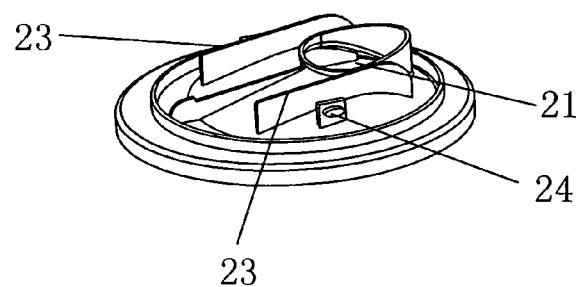

As shown in FIG. 39, a device for measuring and dispensing powder materials of a ninth embodiment illustrates another alternative mode of the above embodiment, wherein the device of the ninth embodiment is the same as the eighth embodiment, except the slide housing 2 does not contain the cover panel 22. Therefore, there is no vibration created during the rotational movement of the slide 3.

As shown in FIGS. 40 to 45, a device for measuring and dispensing powder materials of a tenth embodiment illustrates another alternative mode of the above embodiments, wherein the device comprises a slide housing 2, a slide 3, a retention panel 5, and an elastic unit 6. The slide housing 2 has a through powder inlet slot 21 extended through the slide housing 2 along a direction of gravity. An inlet of the powder inlet slot 21 of the slide housing 2 has an engaging rim 22 in circular shape to engage with the bottom side of the powder container. The slide housing 2 further comprises two guiding panels 23 formed at two sides of the powder inlet slot 21 respectively, wherein two clippers 24 are formed at two outer sides of the guiding panels 23 respectively. The slide 3 comprises a blocking panel 31 and a blocking wall 32. The blocking panel 31 has a coupling side 311 which is a flat surface. The slide 3 further comprises a guiding strip 33 downwardly extended from the blocking panel 31 at a position away from the blocking wall 32. The top side 322 of the blocking wall 32 is formed to align with the coupling side 311 of the blocking panel 31 at a same planar manner. A measure slot 321 is formed within the blocking wall 32. The retention panel 5 comprises a base panel 51 and two side panels 52 upwardly extended from two side edges of the base panel 51 respectively, wherein an elongated guiding slot 511 is formed at the base panel 51. Two clipping slots 521 are formed at the side panels 52 to engage with the clippers 24 of the slide housing 2. The elastic unit 6 is integrally extended from the slide 3 at a position that the elastic unit 6 is inclinedly extended from the outer side 312 of the blocking panel 31.

For installation, the slide housing 2 is mounted at the bottom side of the powder container. The slide 3 is guided to slidably engage between the guiding panels 23, wherein the retention panel 5 is mounted to the slide housing 2 at a position that the clipping slots 521 are engaged with the clippers 24 of the slide housing 2 respectively. Therefore, the slide 3 is pressed between the retention panel 5 and the slide housing 2, wherein the guiding strip 33 of the slide 3 is slidably inserted into the guiding slot 511 to guide the sliding movement of the slide 3 along the guiding slot 511.

According to the tenth embodiment, the coupling side 311 of the slide 3 is fittingly pressed at the slide housing 2, wherein the affixing end 62 of the elastic unit 6 is affixed at the retention panel 5 while the retention panel 5 is mounted to the slide housing 2. In other words, the affixing end 62 of the elastic unit 6 is immovable with respect to the slide housing 2. The free end 61 of the elastic unit 6 is extended to press at the slide 3 to ensure the slide 3 being fittingly pressed at the slide housing 2.

Figure 46:
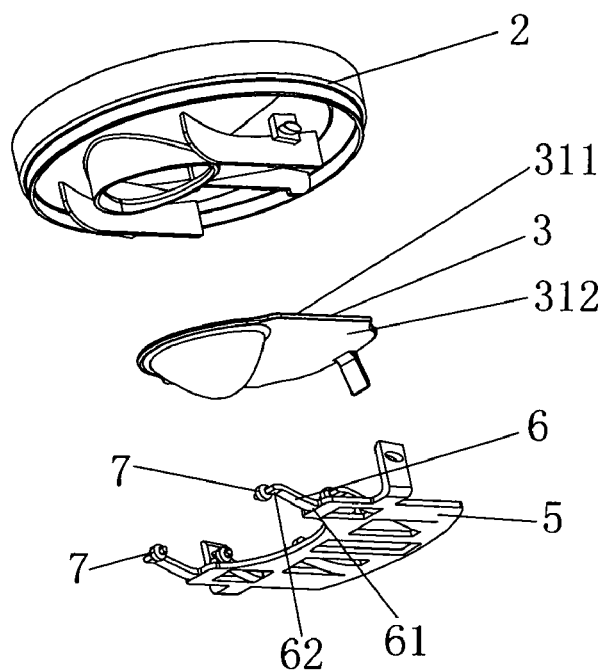
FIG. 46 is an exploded perspective view of a dispenser according to an eleventh preferred embodiment of the present invention.
Figure 47:
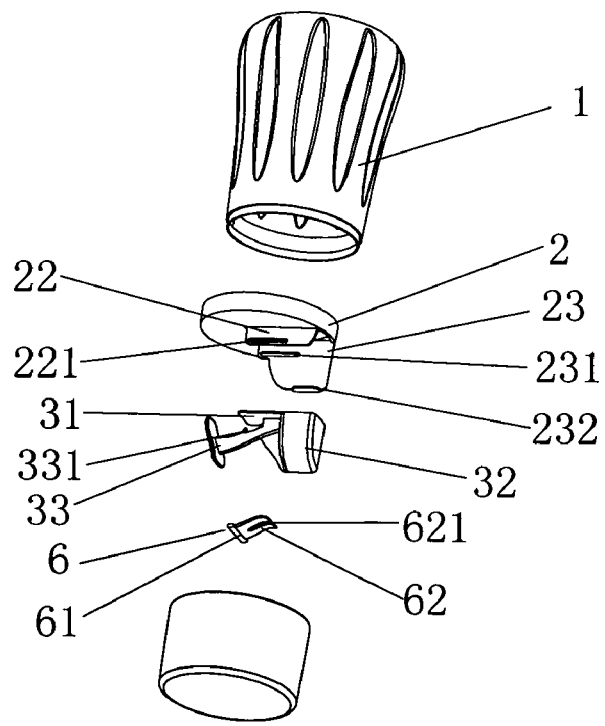
FIG. 47 is an exploded perspective view of a dispenser according to a twelfth preferred embodiment of the present invention.
Figure 48:
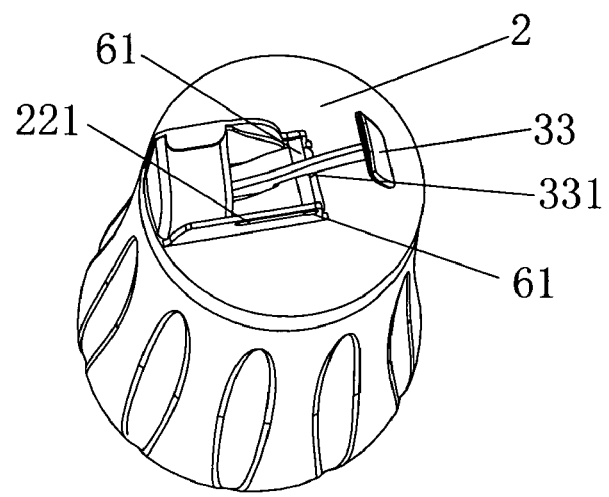
FIG. 48 is a perspective view of the dispenser according to the above twelfth preferred embodiment of the present invention, illustrating the slide at the first position.
Figure 49:
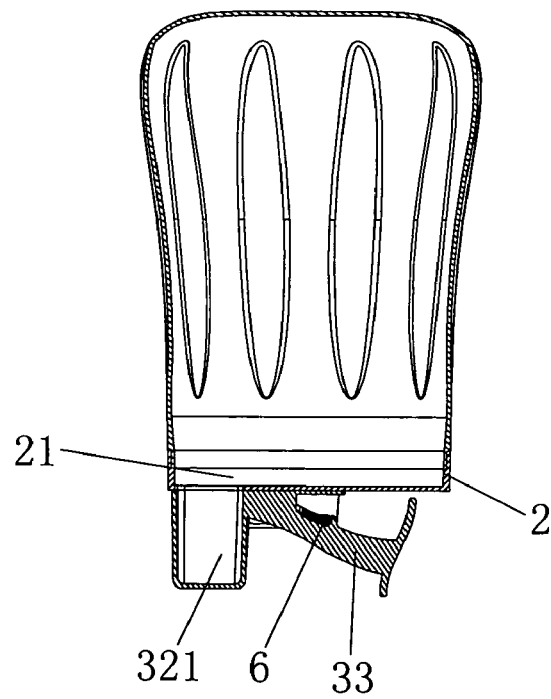
FIG. 49 is a side view of the dispenser according to the above twelfth preferred embodiment of the present invention, illustrating the slide at the first position.
Figure 50:
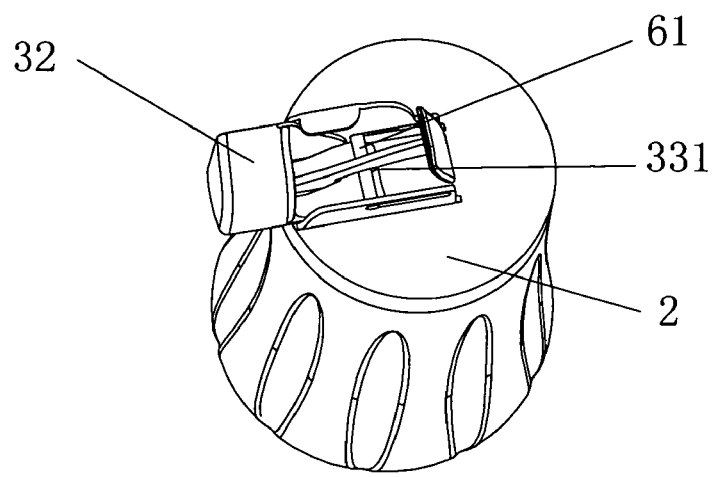
FIG. 50 is a perspective view of the dispenser according to the above twelfth preferred embodiment of the present invention, illustrating the slide at the second position.
Figure 51:
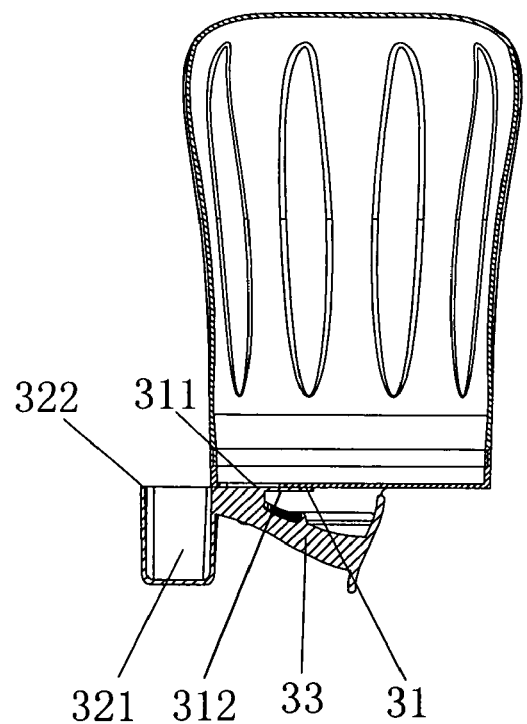
FIG. 51 is a side view of the dispenser according to the above twelfth preferred embodiment of the present invention, illustrating the slide at the second position.

As shown in FIG. 46, a device for measuring and dispensing powder materials of a twelfth embodiment illustrates another alternative mode of the above embodiments, wherein the device comprises a powder container 1, a slide housing 2, a slide 3, and an elastic unit 6. The slide housing 2 has a through powder inlet slot 21 and comprises a first guiding panel 22 and a second guiding panel 23, wherein the height of the second guiding panel 23 is higher than the height of the first guiding panel 22. A first guiding track 221 is provided at the first guiding panel 22 while a second guiding track 231 is provided at the second guiding panel 23, wherein the position level of the first guiding track 221 is the same of the position level of the second guiding track 231. The second guiding panel 23 further comprises a partition panel 232 horizontally extended at the bottom edge of the second guiding panel 23. In addition, the height of the second guiding panel 23 matches with the height of the slide 3. The slide 3 comprises a blocking panel 31 and a blocking wall 32 extended therefrom, wherein the blocking panel 31 has a coupling side 311 which is a flat surface. The slide 3 further comprises a pusher member 33 downwardly extended from the blocking panel 31, wherein the pusher member 33 has a pusher arm 331 extended from the blocking panel 31. The blocking wall 32 has a top side 322 aligned with the coupling side 311 at a same planar manner. The measure slot 321 is defined within the blocking wall 32. The elastic unit 6 has an affixing end 61 and a free end 62, wherein a clipping slot 621 is formed at the free end 62 of the elastic unit 6.

In order to assemble the device of the present invention, the slide housing 2 is coupled with the bottom side of the powder container 1. The slide 3 is coupled with the slide housing 2 at a position that two side edges of the slide 3 are slidably coupled with the first and second guiding tracks 221, 231 of the first and second guiding panels 22, 23 respectively. Accordingly, the pusher arm 331 of the pusher member 33 is pushed to engage with the affixing end 61 of the elastic unit 6 until the clipping slot 621 of the elastic unit 6 is coupled with the pusher arm 331. Then, the affixing end 61 of the elastic unit 6 is slidably engaged between the first and second guiding tracks 221, 231, wherein the free end 62 of the elastic unit 6 is biased against the outer side 312 of the slide 3. When the slide 3 is slidably pushed with respect to the slide housing 2, the elastic unit 6 is driven to horizontally slide along the first and second guiding tracks 221, 231, wherein the coupling side 311 of the slide 3 is slidably pressed at the slide housing 2 during the sliding movement of the slide 3.

According to the twelfth embodiment, the elastic unit 6 is also driven to slide during the sliding movement of the slide 3. In particularly, the affixing end 61 of the elastic unit 6 is horizontally slid along the first and second guiding tracks 221, 231. The free end 62 of the elastic unit 6 is upwardly pressed at the slide 3 at all time during the sliding movement of the slide 3 since the affixing end 61 of the elastic unit 6 is moved corresponding to the sliding movement of the slide 3.

Accordingly, the slide 3 is slidably coupled with the slide housing 2 and is pressed by the elastic unit 6. In other words, when the slide 3 is at an idle (not moving) state, the elastic unit 6 will apply the urging force against the slide 3. When the slide is at a sliding state (during sliding movement), the elastic unit 6 will keep applying the urging force against the slide 3. Therefore, the urging force of the elastic unit 6 can regulate to minimize the clearance between the slide 3 and the slide housing 2. In other words, even though the size of the slide 3 is not perfectly match with the slide housing 2, the elastic unit 6 can always adjust the position of the slide 3 to minimize the clearance and to ensure the coupling side 311 of the slide 3 pressing at the slide housing 2 for preventing the powder materials from being leaked through the clearance. In addition, the elastic unit 6 can further enhance the sliding movement of the slide 3 with respect to the slide housing 2. The structural configuration of the elastic unit 6 can effectively address the shortcomings of the existing fixed structure and can reduce the precision of molding, parts manufacturing, and assembly of all aspects of the device. Through the elastic unit 6, all components can be assembled to form the final product with the best performance and the device can be mass produced to meet the performance requirements of the product.

The assembling method the elastic unit 6 is very flexible. The elastic unit 6 can be integrally formed with the slide housing 2 or the slide 3, wherein the elastic unit 6 can be an elastic piece, an elastic strip, an elastic panel, or a floating panel. The elastic unit 6 can also be an individual component to install into the device, wherein the elastic unit 6 can be an elastic piece, a compression spring, a spring clip, silica gel, foam, or other elastic materials. The elastic unit 6 can have one, two, or a plurality of elastic elements, wherein each of the elastic elements can have one or more affixing ends while each of the elastic elements can have one or more free ends as well. Accordingly, once the affixing end of the elastic unit 6 is affixed in position, the free end of the elastic unit 6 can directly or indirectly apply the urging force against the slide 3 to ensure the slide 3 fittingly pressing at the slide housing 2.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A dispenser for measuring and dispensing powder materials, comprising:

a powder container for containing said powder materials therein, wherein said powder container has a bottom opening, a slide housing, a slide, and an elastic unit, said slide housing having a through powder inlet slot communicating with said bottom opening of said powder container and in such a manner that when said slide housing is coupled at a bottom side of said powder container, said bottom opening is aligned with said powder inlet slot, said slide having a measure slot that a predetermined amount of said powder materials is filled and measured in said measure slot, wherein said slide is movably coupled with said slide housing at a position that said elastic unit applies an urging force at said slide to retain said slide in position, wherein said slide housing comprises a slide body and a retention panel, wherein said powder inlet slot is a through slot provided at said slide body, wherein said retention panel is coupled at a bottom side of said slide body and has a through hole communicating with said powder inlet slot, wherein said slide comprises a blocking panel and a blocking wall extended from one side of said blocking panel, wherein said elastic unit has a U-shaped cross section securely clamping with said retention panel and said slide such that said urging force is applied to minimize a clearance between said retention panel and said blocking panel, wherein said elastic unit comprises a first holding panel and a second holding panel, wherein said first and second holding panels clamp with side edges of said retention panel and said blocking panel at a position that said side edges of said retention panel and said blocking panel are sandwiched between said first and second holding panels, wherein said slide is adapted to move between a first position and a second position, wherein at said first position, said measure slot of said slide is in alignment with said powder inlet slot of said slide housing for said powder materials being filled into said measure slot through said powder inlet slot, and at said second position, said measure slot of said slide is moved away from said powder inlet slot of said slide housing for discharging said powder materials from said measure slot of said slide.

2. The dispenser, as recited in claim 1, wherein said slide has a coupling side slidably engaging with said slide housing, wherein said elastic unit has an affixing end being affixed in position and an elastic free end biasing against said slide to apply said urging force thereat so as to ensure said coupling side of said slide being engaged with said slide housing, wherein said first and second holding panels clamp with said side edges of said retention panel and said blocking panel that said coupling side of said slide is fittingly pressed against said retention panel.

3. The dispenser, as recited in claim 2, wherein said elastic unit is a separated unit supported between said slide and said slide housing to apply said urging force against said slide, or said elastic unit is integrally extended from said slide housing to apply said urging force against said slide, wherein said slide body further comprises two inverting hooks extended spacedly and vertically, wherein said retention panel has two spaced apart hooking slots aligned with said inverting hooks and two hook lockers provided at said hooking slots respectively, wherein said inverting hooks of said slide body are extended through said hooking slots of said retention panel to engage with said hook lockers respectively, such that said retention panel is securely coupled at said bottom side of said slide body so as to ensure said through slot of said retention panel being aligned with said powder inlet slot of said slide body.

4. The dispenser, as recited in claim 2, wherein said blocking panel defines said coupling side thereat and said blocking wall is extended from said blocking panel to define said measure slot within said blocking wall, wherein when said slide is moved at said second position, an outlet of said powder inlet slot is sealed by said coupling side of said blocking panel.

5. The dispenser, as recited in claim 4, wherein said slide body further comprises two inverting hooks extended spacedly and vertically, wherein said retention panel has two spaced apart hooking slots aligned with said inverting hooks and two hook lockers provided at said hooking slots respectively, wherein said inverting hooks of said slide body are extended through said hooking slots of said retention panel to engage with said hook lockers respectively, such that said retention panel is securely coupled at said bottom side of said slide body so as to ensure said through slot of said retention panel being aligned with said powder inlet slot of said slide body.

* * * * *